(12) United States Patent
Kumar et al.

(10) Patent No.: US 11,485,249 B2
(45) Date of Patent: Nov. 1, 2022

(54) AND CONTROL OF ELECTRIC VEHICLE CHARGING INFRASTRUCTURE

(71) Applicants: Microgrid Labs Inc, Durham, NC (US); The Regents of the University of California, Oakland, CA (US)

(72) Inventors: Arun Kumar, Cary, NC (US); Namit Singh, Boulder, CO (US); Scott Moura, Berkeley, CA (US); Sharabh Shukla, Santa Clara, CA (US); Narayanan Sankar, Cary, NC (US)

(73) Assignee: Microgrid Labs Inc., Cary, NC (US)

( * ) Notice: Subject to any disclaimer, the term of this patent is extended or adjusted under 35 U.S.C. 154(b) by 202 days.

(21) Appl. No.: 16/771,041

(22) PCT Filed: Dec. 21, 2018

(86) PCT No.: PCT/US2018/067389
§ 371 (c)(1),
(2) Date: Jun. 9, 2020

(87) PCT Pub. No.: WO2019/126806
PCT Pub. Date: Jun. 27, 2019

(65) Prior Publication Data
US 2021/0276447 A1    Sep. 9, 2021

Related U.S. Application Data

(60) Provisional application No. 62/609,403, filed on Dec. 22, 2017.

(51) Int. Cl.
*B60L 53/68*    (2019.01)
*B60L 53/66*    (2019.01)
(Continued)

(52) U.S. Cl.
CPC ............... *B60L 53/68* (2019.02); *B60L 53/63* (2019.02); *B60L 53/64* (2019.02); *B60L 53/66* (2019.02);
(Continued)

(58) Field of Classification Search
CPC .......... B60L 53/68; B60L 53/63; B60L 53/64; B60L 53/66; B60L 2240/80; B60L 2250/20
See application file for complete search history.

(56) References Cited

U.S. PATENT DOCUMENTS

| 2012/0203726 A1* | 8/2012 | Klabjan | B60L 53/63 706/46 |
| 2019/0184850 A1* | 6/2019 | Lee | B60L 53/68 |
| 2019/0202416 A1* | 7/2019 | Lai | B60L 53/305 |

* cited by examiner

*Primary Examiner* — David V Henze-Gongola
(74) *Attorney, Agent, or Firm* — Jay R Akhave; PatentScience LLC

(57) ABSTRACT

A system for configuring an Electric Vehicle (EV) charging infrastructure, the apparatus comprising. The system receives user direction and inputs regarding a custom EV charging infrastructure, submits the data an optimal planning module which is configured for performing optimization based on objectives in view of a set of constraints; and generates a recommendation from the optimal planning module for a custom EV charging infrastructure based on charging needs and behavior of the consumers toward deferring upgrades in electric infrastructure without compromising energy required for electrical transportation. The system validates the results from the optimal planning module using discrete event-based simulator and generates charging schedules from the controlling module for custom EV charging based on information about EV data, distributed energy resource (DER), and the electric infrastructure without compromising energy required for electrical transporta- (Continued)

tion and causing undue impact on the electrical infrastructure.

30 Claims, 10 Drawing Sheets

(51) Int. Cl.
*B60L 53/64* (2019.01)
*B60L 53/63* (2019.01)

(52) U.S. Cl.
CPC ....... *B60L 2240/80* (2013.01); *B60L 2250/20* (2013.01)

AND CONTROL OF ELECTRIC VEHICLE CHARGING INFRASTRUCTURE

CROSS-REFERENCE TO RELATED APPLICATIONS

This application claims priority to, and the benefit of, U.S. provisional patent application Ser. No. 62/609,403 filed on Dec. 22, 2017, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to electrical grid planning, and more particularly to systems and methods for optimizing an electrical vehicle (EV) infrastructure.

2. Background Discussion

Electric grids are the most complex infrastructure ever built, and they cumulatively account for many billions of dollars' worth of investment. Electric vehicle (EV) charging even with a modestly sized battery represents a proportionately large electric load on the grid. Electric grids and electrical networks in most facilities were historically never designed to supply such large loads. Growing EV penetration towards a carbon-free, or reduced-carbon, society of the future poses a question for the present generation. Rather than upgrading the electric grid at a cost of many billions of dollars, it would be desirable to have a more reliable, robust electric grid capable of sustaining vision for the future at a much lower cost.

The electric vehicle market is expected to grow rapidly in the coming years. Some estimate the number of EVs on road to rise to 2 million in 2020 from current 0.7 million. A rapid proliferation of EVs is expected in urban areas which will create a spike in electrical demand with an increased possibility of overloading the network infrastructure, creating imbalances, and accelerating infrastructure upgrades. As such, the electrical distribution network is an important challenge for the adoption of EVs. This warrants an urgent strategy that addresses the problem of overloading on electrical networks while allowing users to charge their EVs.

Accordingly, a need exists for enhanced methods of electric vehicle (EV) charging. The present disclosure fulfills that need and provides additional benefits over previous technologies.

BRIEF SUMMARY

The present disclosure is directed towards the design and control of Electric Vehicle (EV) charging infrastructure in a way that seeks to minimize the overall annualized cost of investment and defer upgrades in electric infrastructure without compromising energy required for electrical transportation.

The disclosed system seeks to address the problem by building a software solution that configures and controls the EV charging infrastructure for mitigating these problems by using state of the art advances in mathematical modeling, optimization and simulation using data sciences and machine learning. The system software configures and recommends a custom EV charging infrastructure based on charging needs and behavior of the consumers in a given application, whether it be a campus, commercial facility, commercial buildings, residential buildings, public facilities (e.g., shopping malls, parking garages, public EV charging facilities, roadside charging, gas stations, bus depots, etc.). The custom designed EV charging infrastructure ensures that the energy needs to an individual in the facility or a building are met at the lowest cost without incurring the risk of an overload. This is accomplished by the system utilizing novel processes that optimally size the number and size of EV charging stations and intelligently schedule their operation during the day in combination with other facility electrical loads and distributed generation/energy storage (DER).

A key to intelligently planning, designing and controlling EV charging infrastructure, is to forecast the mobility behavior (including battery state of charge) and jointly optimize the design and control of the charging stations with other facility loads, distributed energy resources (DERs), such as solar photovoltaics and stationary energy storage. The disclosed solution uses stochastic mathematical models, machine learning, and convex optimization to determine the optimal component sizes and control set-points. Importantly, this strategy incorporates robustness to uncertain generation and loads through statistical methods. Without a robust strategy, infrastructure decisions are highly susceptible to both under-sized solutions and over-aggressive control solutions that result in unnecessarily expensive operational performance.

The EV controlling module complements the planning module to ensure that the assumptions and anticipated benefits of the optimized design are realized during operations and are leveraged to provide the best service to the consumer. This intelligent infrastructure enhances the EV experience and provides impetus for its adoption. A planning module provides for initial design and for long term operational planning.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. System Overview

Figure 1:
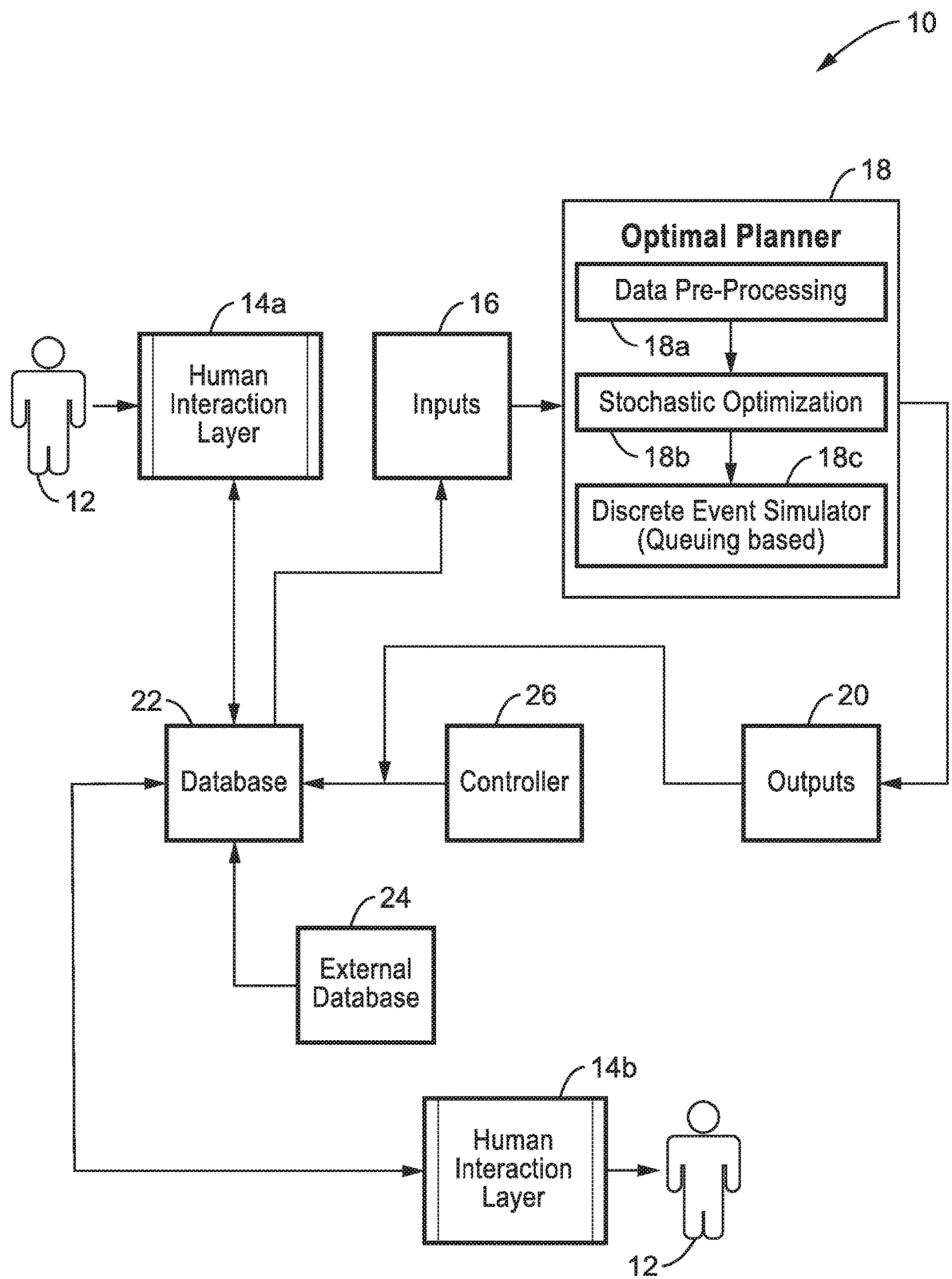
FIG. 1 shows a block diagram of an overall process for optimal planning showing different processes interacting with each other within the software according to an embodiment of the present disclosure.

FIG. 1 illustrates a high-level view of a system 10 for optimal planning of EV charging infrastructure of the present disclosure. The user 12 (e.g. a solution architect, designer, a facility manager, a consultant, fleet operator, etc.) interacts with the system for design of the EV charging infrastructure. In one embodiment, the system 10 is utilized by a commercial company that provides or develops Electric vehicles (EVs) or EV charging solutions. The system 10 may be implemented via software such as "SaaS" software as a service, or it could be downloaded as a standalone software.

In a preferred embodiment, the user 12 interacts with the software through a web interface or through a computing device of input via a human interaction layer 14a. The computing device could be a computer, a hand-held computer, laptop or a mobile device, or similar computing device with an I/O interface. Interacting through the interface 14a, the user typically enters a pertinent data regarding the various aspects (inputs 16) of the system. These inputs 16 are made available to the optimal planning module 18, which generates outputs 20 that are directed through the human interaction layer 14b for use by the user 12.

In one embodiment, some of the commonly used 16 data may be stored in a database 22, e.g. "Master Data Library" for easy data entry by the user 12. The user 12 keys the inputs 16 that closely resemble the situation that they may be modeling. The inputs 16 are given through the interface 14a, where multiple screens provide the option of choosing the data or entering the data. Once all required data is entered, the data flows into the database 22. During the process of entering the data, data from various sources (e.g. external database 24) is pulled depending on the selection made by the user 12. The data may be pulled in from the master data library 22 or it could also be pulled in through a controller 26 that controls existing Distributed energy resources (DERs) or EV charging stations.

The master data library 22 preferably comprises a database or a library that contains data that is common to most users, for example data like DER specifications, data on EV charger's specifications, including cost, rated power and so forth. The library 22 can also house weather data for locations around the world. The key idea behind the master data library 22 is to make it easy for the user 12 to pull the data from the library instead of manually keying the data every time. This saves substantial effort and time on the part of the user in regard to modeling.

A portion of this data can also come from actual operations of existing DERs or EV charging stations. Obtaining this data directly from the controller 26 can be performed automatically, or in some applications it could be obtained manually, for example where the user 12 manually collects this data and places it in the database 22 through the interface 14a. The other way in which data can be directly retrieved into the system 10 is through an automated system using an automated interface that directly interfaces to obtain the data. Typically, the data involves describing DER specifications, or the specifications of EV charging stations, or data on the operating characteristics. This data can be taken a priori, or it could also be keyed in after the user 12 makes it explicit that the facility has existing DERs or EV charging stations. The controller 26 can also collect the facility load data and direct it into the system 10. The load data could comprise electrical loads, gas loads, heating loads, cooling loads, and similar data.

Once all the data is keyed, or otherwise entered into the database 22, the database 22 generates a separate database file also called the input database file (not shown) that goes into the optimal planning module 18 as an input file. The optimal planning module 18 then takes this data as input and runs a series of defined pre-processing method steps or processes at statistical pre-processing module 18a to aid in solving the optimization problem via stochastic optimization solver 18b. Outputs from the optimization solver 18c specify the resources to be deployed and their usage as a function of time. These resources become inputs to a discrete-event simulator 18c. The simulator 18c uses the resources suggested by the optimizer 18b, together with traffic statistics, to calculate a variety of statistics about waiting times, charging services, and departure SoCs. Traffic statistics are used by a traffic simulator to generate thousands of individual traffic events. The word "events" is used here in the technical sense of probabilistic events. These many simulated events are used to test the adequacy of the optimization solver's recommendations. If tests suggest that the optimizer's recommendations be modified, they are, and the new recommendations are tested again with a new set of generated events. This process iterates until adequacy is established.

The final values may then be entered/sent/thrown back into database 22 or another database. The output interface (human interaction layer) 14b then displays the relevant results (outputs 20) on the interface for user 12 viewing. The interface 14b may be configured to runs data analytics and visualization to help the user 12 understand and interpret the data. In one embodiment, the human interaction layer 14b comprises a web interface that also process the results to make it easier for the user 12 to comprehend the data and make decisions on implementing the proposed system 10.

If the user 12 decides on implementing the project, the decision on optimal configuration of the system is passed on to the controller 34 that is controlling the existing infrastructure. In some instances, the remainder of the data is directed to the agency or person(s) tasked with the design of such a system.

2. System Inputs/Outputs

Figure 2:
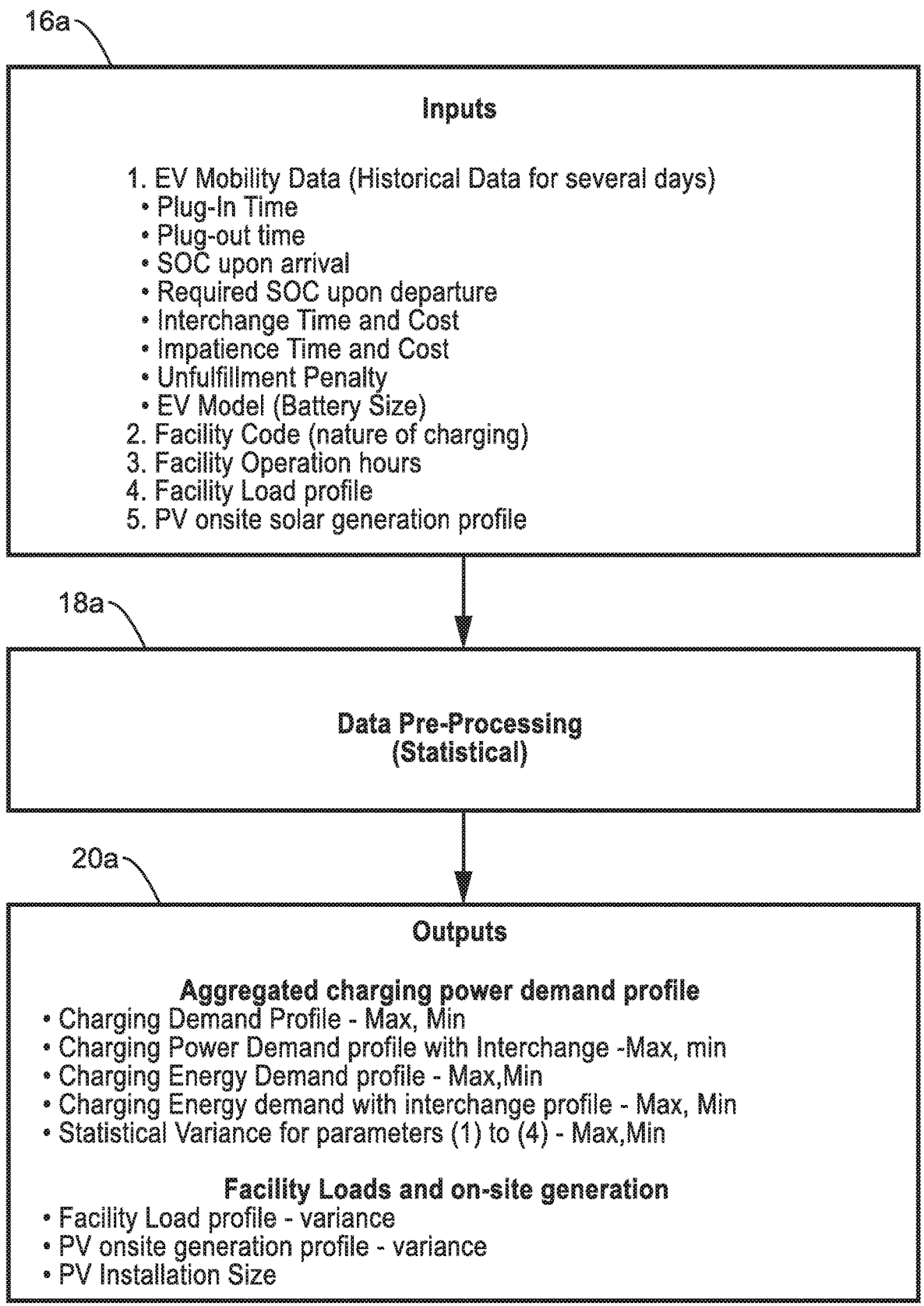
FIG. 2 is a block diagram showing the details of the process of statistical pre-processing of data within the optimal planning step of the software according to an embodiment of the present disclosure.

FIG. 2 through FIG. 4 illustrate the various inputs that may be used by the pre-processing module 18a, optimizer 18*b* and simulator 18*c* of the optimal planner module 18. Referring to FIG. 2, a series of initial inputs 16*a* are fed into the data pre-processing module 18*a*, which generates pre-processed outputs 20*a*. Exemplary initial inputs 18*a* may comprise EV mobility data over a period of time such as arrival and departure (plug-in, plug-out) time, State-of-Charge (SoC) upon arrival, required SoC upon departure, interchange time and cost, impatience time and cost, unfulfillment penalty, EV model (battery size), as well as other inputs such as facility code (nature of charging), facility operation hours, facility load profile, PV onsite solar generation profile, etc. SoC refers to the percentage of charge present in the battery of the EV when presented to the charger.

Exemplary pre-processed outputs 20*a* may comprise charging power and energy demand data such as aggregated charging demand profile (max, min), aggregated charging power demand profile with interchange (max, min), aggregated charging energy demand profile (max, min), aggregated charging energy demand with interchange profile (max, min), and statistical variance for parameters for the above four profiles (max, min), as well as facility loads and on-site generation data such as facility load profile (variance), PV onsite generation profile (variance) and PV installation size, etc. A variation of this will generate the above data at each vehicle level that will be used by the optimizer 18 to get more accurate optimization results. I.e. the optimizer 18 may be configured to optimize at the aggregated level by aggregating demand of vehicles (fast but less accurate), or at individual vehicle level (slow but more accurate).

Figure 3A:
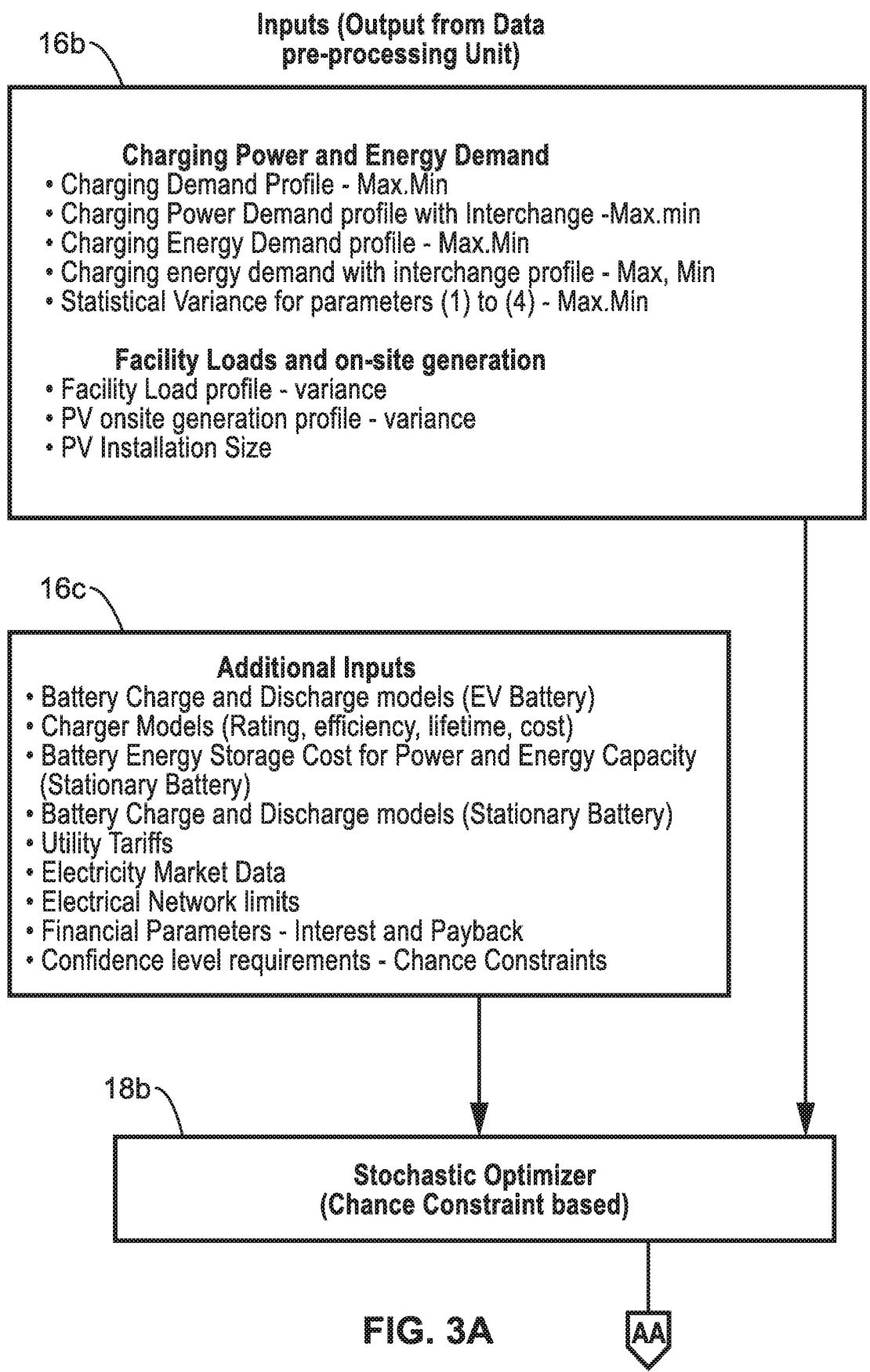
FIG. 3A and FIG. 3B show a block diagram detailing the stochastic optimizer within the optimal planning step of the software according to an embodiment of the present disclosure.
Figure 3B:
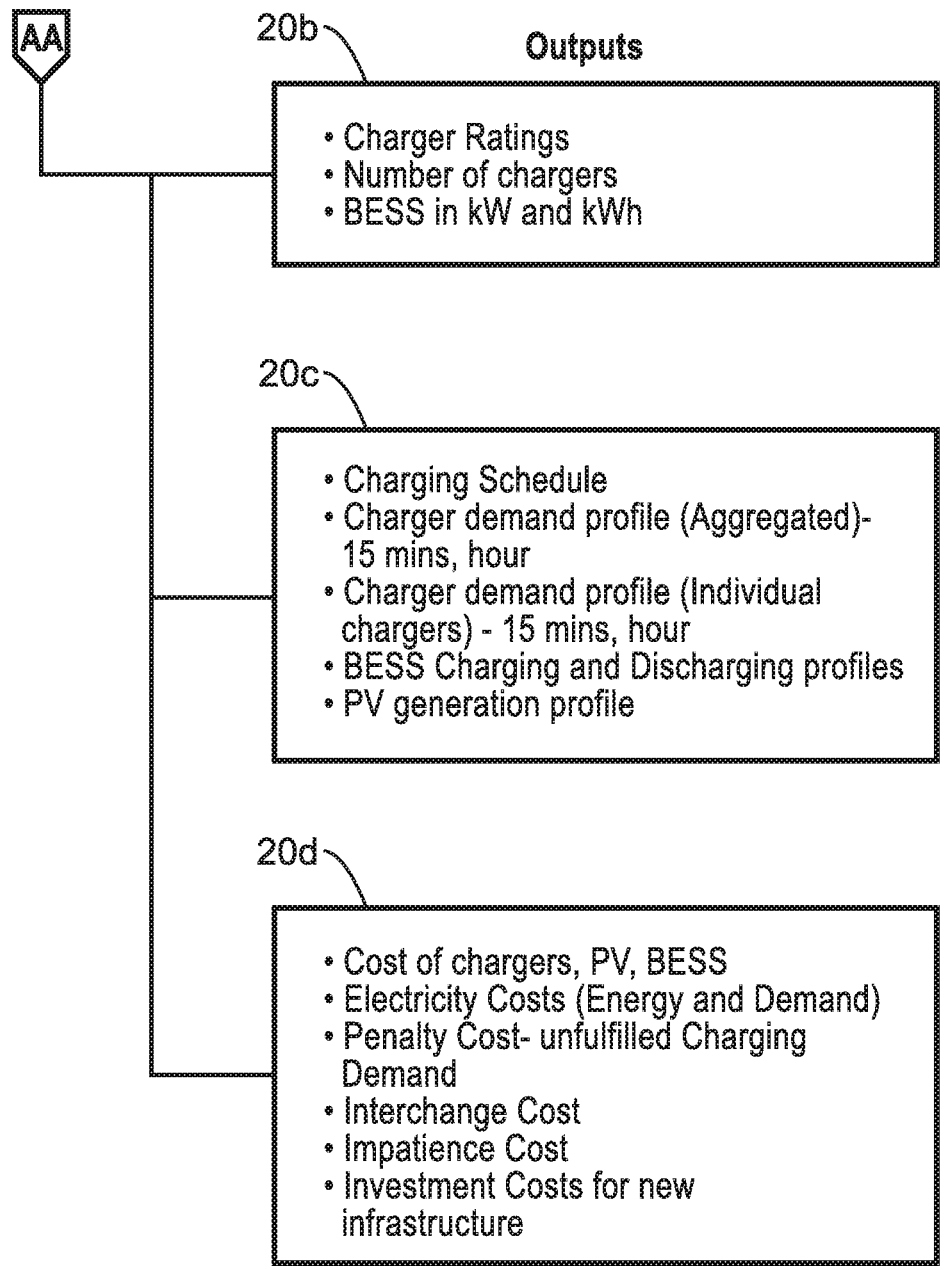

Referring to FIG. 3A and FIG. 3B, intermediary inputs to the chance constraint-based stochastic optimizer 18*b* may include a first set of intermediary inputs 16*b* (essentially comprising the pre-processed outputs 20*a* from module 18*a*) and additional inputs 16*c* comprising one or more of battery charge and discharge models (EV battery and stationary battery), charger models (rating efficiency, lifetime, cost), battery energy storage cost for power and energy capacity (stationary battery), utility tariffs, electricity market data, electrical network limits, financial parameters (e.g. interest and payback), and confidence level requirements (e.g. chance constraints), etc.

Intermediary outputs to the chance constraint-based stochastic optimizer 18*b* may include one or more of intermediary outputs 20*b* (e.g. charger ratings, number of chargers, BESS in kW and KWh), intermediary outputs 20*c* (e.g. charging schedule, charger demand profile (aggregated, 15 mins, hour), intermediary outputs 20*d* (e.g. cost of chargers, PV, BESS, Electricity costs (energy, and demand), penalty cost-unfulfilled charging demand, interchange cost, impatience cost, investments costs for new infrastructure), etc.

Figure 4A:
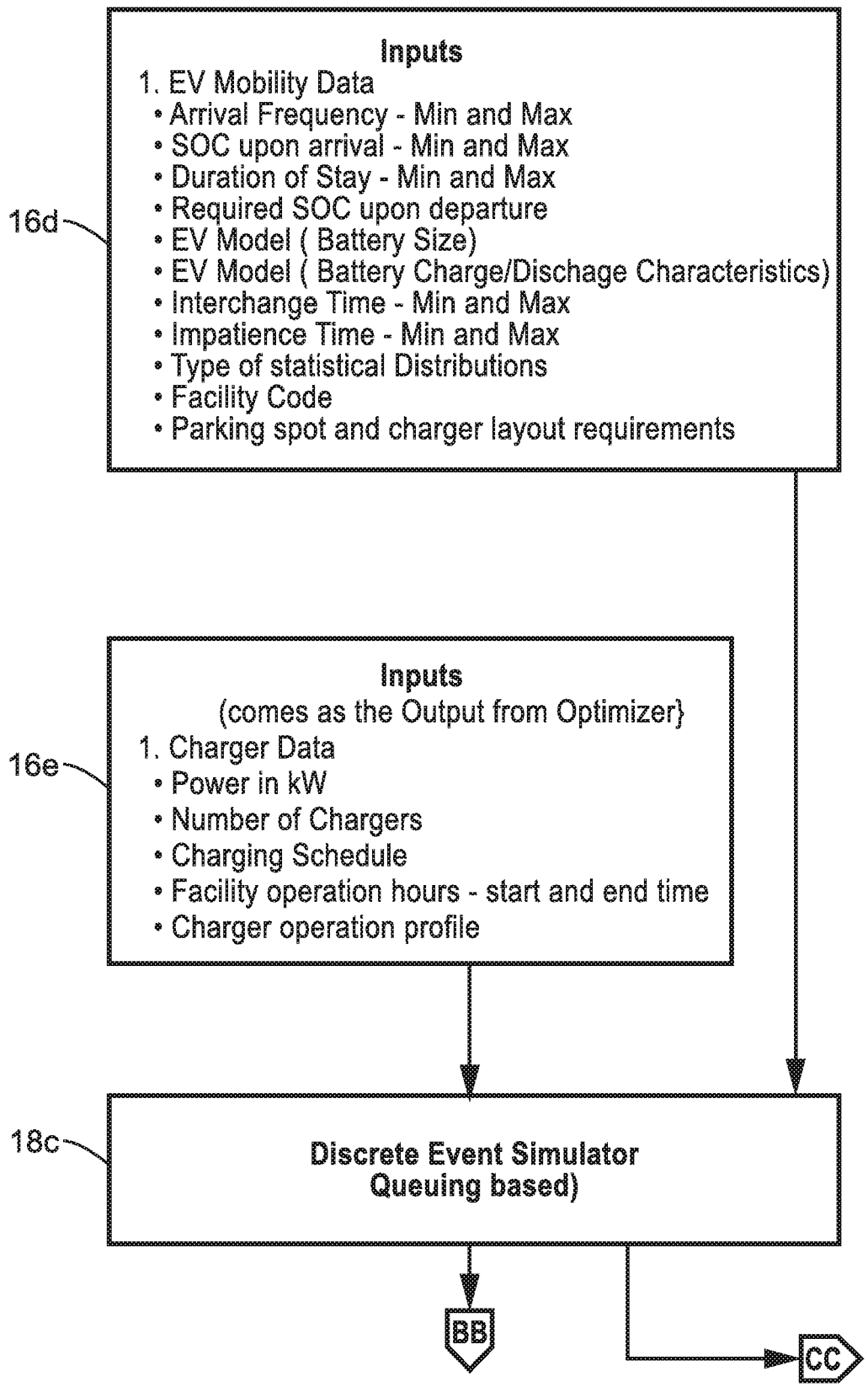
FIG. 4 through FIG. 4C show block diagrams detailing the process of the discrete event simulator within the optimal planning step of the software according to an embodiment of the present disclosure.
Figure 4B:
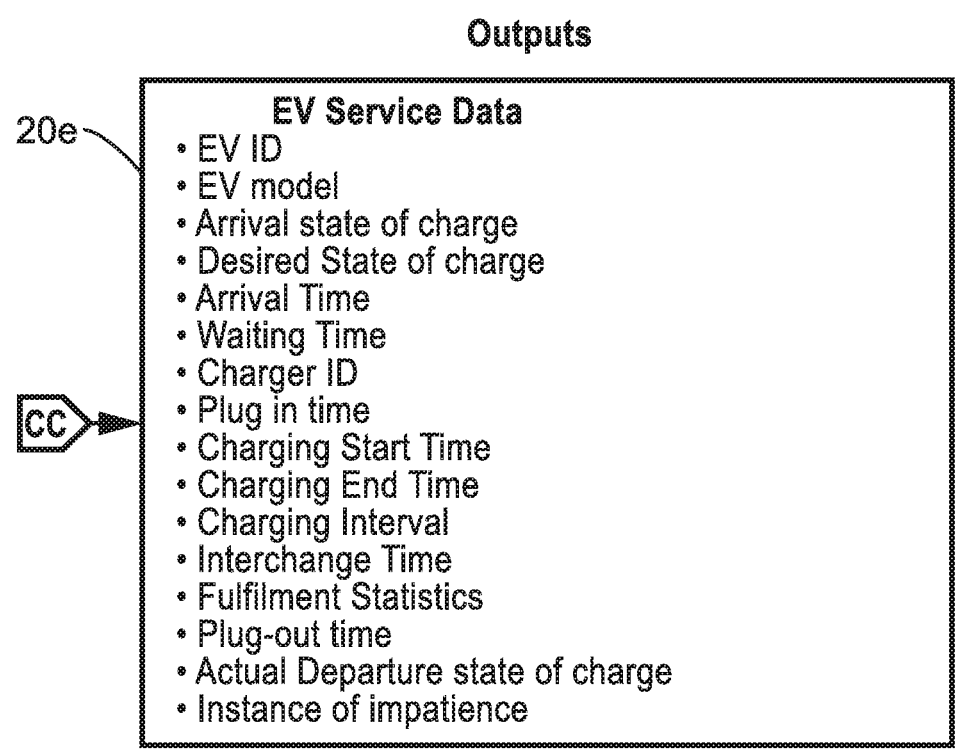
Figure 4C:
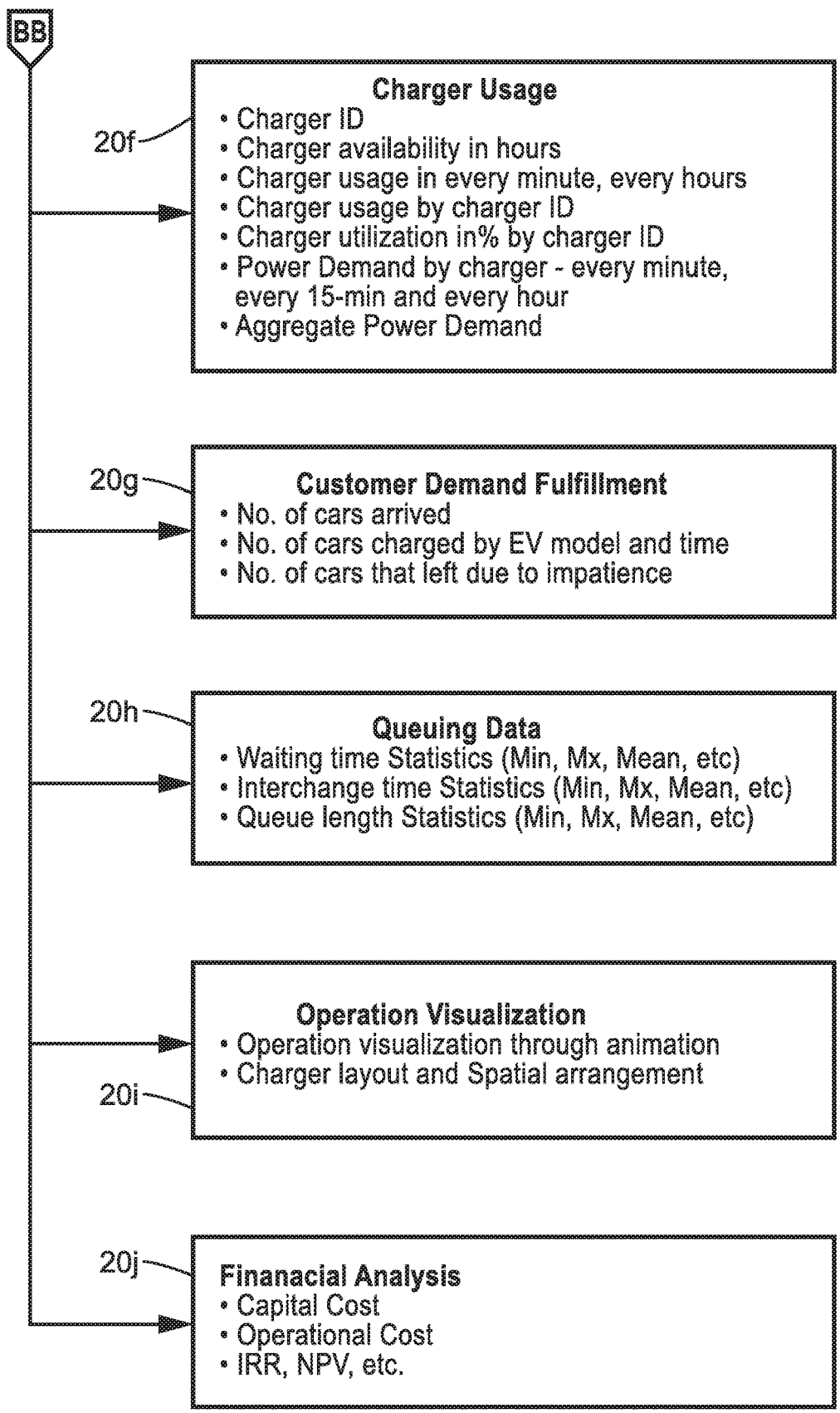

Referring to FIG. 4A through FIG. 4C, inputs to the queuing-based discrete event simulator 18*c* may include EV mobility data inputs 16*d* such as one or more of arrival frequency (min and max), SoC upon arrival (min and max), duration of stay (min and max), required SoC upon departure, EV model (battery size, charge/discharge characteristics), interchange time (min and max), impatience time (min and max), type of statistical distributions, facility code, parking spot and charger layout requirements, etc.). Additional inputs 16*e* may be provided by outputs 20*b*-20*d* from the optimizer 18*c* (e.g. charger data such as power in kW, number of chargers, charging schedule, facility operation hours (start and end time), and charger operation profile.

Exemplary outputs 20*e* from the discrete event simulator 18*c* may include EV service data such as EV ID, EV model, arrival state of charge, arrival time, waiting time, charger ID, plug in time, charging start time, charging end time, charging interval, interchange time, fulfillment statistics, plug-out time, actual departure state of charge, instance of impatience, etc.

Further output from the discrete event simulator 18*c* may include charger usage characteristics 20*f*, customer demand fulfillment data 20*g*, queuing data 20*h*, operation visualization 20*i* and financial analysis 20*j* (see FIG. 4C).

Additional inputs 16 to optimal planner may comprise infrastructure facility data describing the variables associated with a facility (for example, parking spots in an office, parking garage, bus depots etc.) to optimize its EV infrastructure. The inputs associated with infrastructure facility may include number of parking spots, number and rating of existing EV chargers (if any), electrical infrastructure limits, facility loads, and number and size of existing Distributed Energy Resources (DER). Rating refers to the type of EV chargers used (for example, Level 2, Level 3, etc.). Electrical infrastructure limits describe the power handling limits of the facility's existing electrical equipment, such as transformers, cables, etc. The electrical load profile of other loads in the facility such as air conditioners, heaters, etc. and the statistical distribution to describe their variance and co-variance are described under facility loads. Existing DER refers to existing energy generation sources such as solar photovoltaics (PVs), wind turbines, energy storage devices etc.

Further inputs 16 may comprise facility preferences including load management strategies, market participation (vehicle to grid), grid availability, emissions, charger operation hours, queue management strategies, algorithm preferences, and the like. Load management strategies include the operational flexibility available at the facility to shift/curtail electric loads, for example, pre-cooling, shutting off non-critical loads. Market participation covers the ability to use EV batteries, on-site storage and generation sources to supply energy/capacity to energy markets and thereby generate a revenue stream. Grid availability refers to the full/partial/non-availability of the grid, for example, off-grid facilities in remote locations. This could also include power outage scenarios/situations. Emissions covers regulatory requirements and facility owners' preferences with respect to controlling emissions from using non-renewable energy sources. The time the charger can be accessed for EV charging refers to the charger operation hours, for example, facility operation hours. Queuing strategies such as FIFO (First in first out), egalitarian approach (EV with lowest state of charge (SoC) gets charged first), market-driven (EV owner paying highest cost will get charged first), customer classes (VIP, non-VIP), minimum and maximum queue length, minimum and maximum waiting time, operating schedule driven (to meet operating schedules of fleet vehicles), etc. comprise queue management strategies. This may also include meeting customer requirements for superfast, fast and normal charging. Algorithmic preferences refer to the approach adopted by the facility to meet EV charging requirements, for example, deterministic approach (quick solving but inaccurate results), stochastic approach, etc.

For input data 16 comprising mobility behavior/preferences, the system 10 may be configured to collect variables associated with each EV in the facility, for example determining expected arrival time and departure time, trip-schedule/time-table as well as expected SoC of EVs in the facility at arrival and departure. Battery capacity refers to the electric capacity (in kW and kWh) of the EV battery.

Mobility behavior is not constant and parameters describing the variability are also included, for example statistical distributions.

Input data 16 may include end user preferences data that accounts for the personal preferences and choices of EV owners. This is very similar to the inputs associated with the facility preferences data. Exemplary data may comprise customer categories/priorities, maximum and minimum waiting time, vehicle interchange time, maximum and minimum queue length, maximum and minimum SoC at different time slots and maximum and minimum pricing. Here, queue length describes the number of EVs at a given time waiting to get access to the EV chargers.

Input 16 related to EV data is generally related to the parameters associated with EVs. The number, size, model and type of EVs, size, type and battery models of EVs and the charger plug-in compatibility, as well as EV population data may be considered.

Input 16 relating to DER specifications may include efficiency, capacity, ramping rates, and similar energy source parameters, as well as technical specifications of potential onsite energy storage and generation equipment, such as solar PV systems, gas turbines, wind turbines, and so forth.

The utility/market data 16 may comprise energy export rates, utility-imposed tariffs, limits, costs and availability associated with electricity, gas and other fuels. Market opportunities refer to the market rates associated with exporting electricity and thereby generating a revenue stream.

Input 16 may also include weather data comprising weather parameters that can impact operations and efficiencies of the various components within the electrical infrastructure, such as wind speed, average temperature, and solar GHI (global horizontal irradiance) data, etc.

Financial data block deals with the financial parameters that can be used to evaluate the economic feasibility and return on investments. These parameters include interest rate, payback period, investment budget and infrastructure upgrade cost limit, and so forth.

The financial output data 20 generally influences the investment decisions to be made by the facility operator. These outputs may include type, number and size of EV chargers, and the type, number and size of DERs to be installed in the facility. The investment required to upgrade the EV infrastructure and the annualized investment cost help the facility operator to decide on the required investments. Comprehensive estimates are also provided for the operational costs (hourly, daily, monthly and annual) and the energy bills of the facility. Output 20 also presents ways to gauge the value of the EV infrastructure based on its intended use. Suggested pricing schemes account for the charger utilization prices that can be imposed by the facility to generate a revenue stream. A detailed financial analysis of the project including the Internal Rate of Return (IRR), cash flow, net present value, etc. is also provided.

Output 20 relating to technical operations generally details all the technical outputs. Information is provided on the effect of residential load and each EV charger's load on the load profile of the facility load as a function of time. For example, in one embodiment this load information comprises the per unit time load profile for facility load with contribution from residential load and each EV charger load. Charger utilization provides a measure of the amount of time the charger is used, alternatively, the amount of the time the charger remains idle and unused. The queue length, waiting time and space requirement statistics are compiled as a function of time for each charger. The fulfilled and unfulfilled charging requirements are also shown.

Output 20 in the form of operation visualization enables the planners to visualize the simulated operation of the charging facility infrastructure illustrating EV charger layout, arrival and departure of EVs, charging and interchange of EVs, queue formations, etc. with associated statistics.

Data includes mean values and variances or min and max values with types of distribution to capture stochastic behavior.

Table 1 shows software code including instructions for the EV charging simulation in accordance with the discrete simulator module 18*c* of FIG. 1. Table 2 shows software code including instructions for the EV charging station planning in accordance with the optimal planning module 18*b* of FIG. 1. It is appreciated that the processes disclosed in Table 1 and Table 1 are provided for exemplary purposes only, and that the systems and method of the present disclosure may be implemented via alternative approaches disclosed herein or available in the art.

3. Optimal Planning Module

Figure 5:
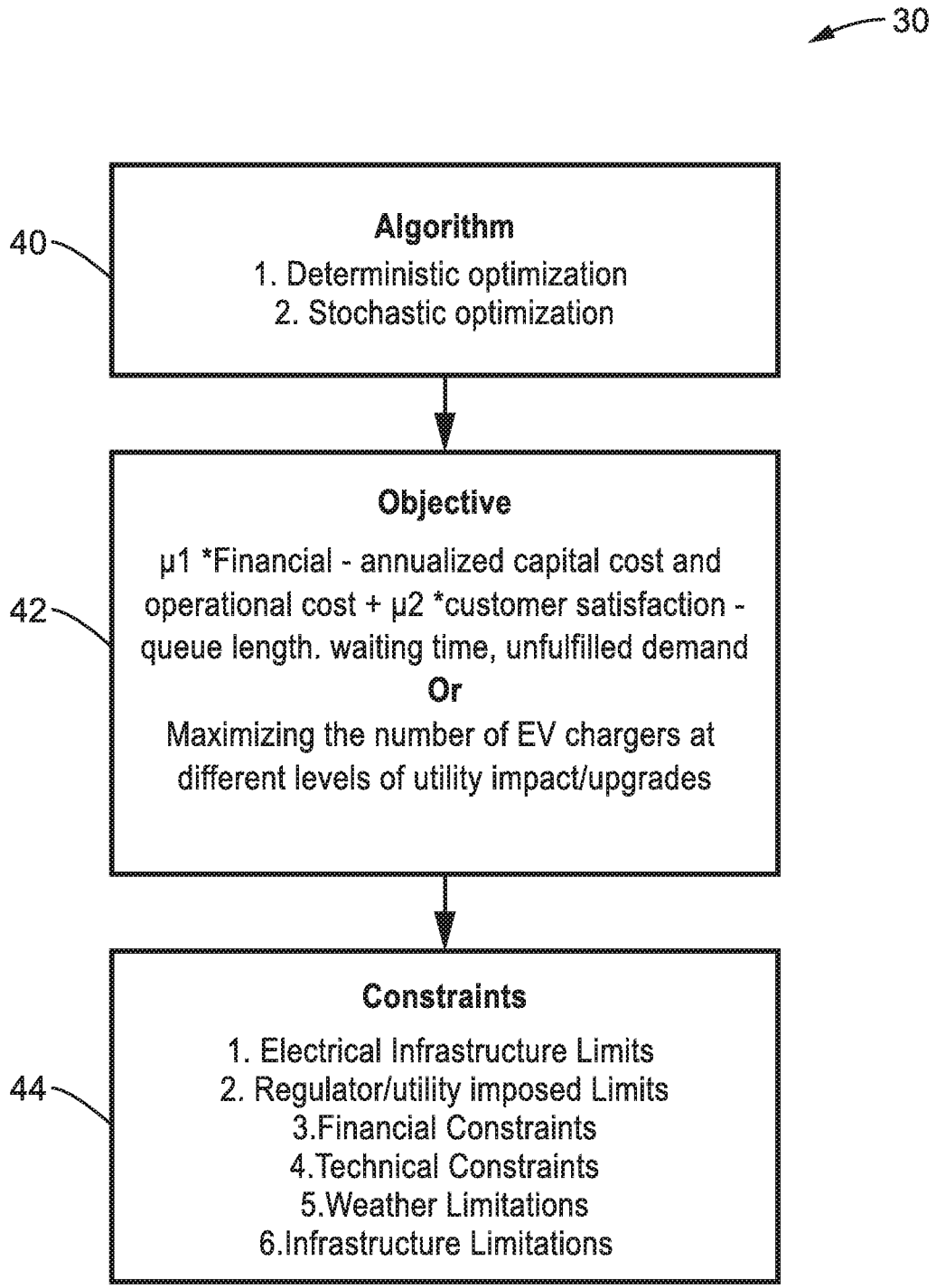
FIG. 5 is a flow diagram of overall algorithmic functionality in the optimal planning module according to an embodiment of the present disclosure.

FIG. 5 illustrates an example embodiment of optimal planner flow 30 for operation of optimal planning module 18 in accordance with the present description. The optimal planner performs the optimization method (algorithm) for generating an optimal design and planning of the EV charging station together with DERs. The type of formulation is preferably performed as a mixed integer problem. Depending on the choice of method it could utilize a mixed integer linear program or mixed integer conic program (e.g., second order conic). The mixed integer conic program adopts chance-constraints, which ensure some constraints to be satisfied by a certain probability, to tackle uncertainty of EV charging demands, PV power generation etc., which is able to balance the objectives on minimizing investment costs and increasing quality of service.

3.1 Planning Algorithm

The planning algorithm shown in block 40 of FIG. 5 can be deterministic or stochastic. The choice of algorithm is largely dependent on user 12 preference, i.e. the user 12 chooses the algorithm (method) to be run in their preferences. If the chosen algorithm is deterministic, the problem is now in the form of a mixed integer linear program, otherwise if the stochastic nature of some of the variables are considered, the problem moves to a form of mixed integer conic program.

3.2 Objective Function

The optimization problem is configured with an optimization function also called the objective function shown in block 42 of FIG. 5. In one embodiment, the objective function 42 comprises a weighted sum of annualized capital costs plus operational cost and also considers end user convenience (interchange/transition costs and time). It also minimizes unfulfilled charging demand which minimizes the inconvenience to the EV user. The annualized capital costs include the annualized capital cost of DERs, EV charging stations, operating costs and any infrastructure upgrades. In at least one embodiment, the weights for these objective functions can be adjusted by the user.

In a second embodiment, the user has the option of choosing another objective function 42 in which the maximum number of chargers that can be installed is calculated within the constraints that there is no infrastructure upgrade.

The objective function 42 may also comprise one or any combination of the following. In the example shown in FIG.

5, the optimal planner 40 supports two different algorithms, although the system 10 may be configured to support any desired number. The preference to these algorithms depends on the choice made by the user. The first option is deterministic where uncertainty in any of the parameters is not considered when modeling the system. The second option is the stochastic version, where the algorithms account for the uncertainty in some of the parameters like EV arrival time, departure time and so forth.

By way of example and not limitation, the embodiment depicts an optimal planner having two different objective functions, as described below. The first function is to Minimize $\mu_1$*Financial such as minimizing annualized capital cost and operational cost the second function it to maximize $\mu_2$*customer satisfaction, such as queue length, waiting time, unfulfilled demand, and so forth.

3.3 Optimal Planner Constraints

Block 44 of the optimal planner 30 of FIG. 5 provides the best solution within the limits of a plurality of constraints, including, but not limited to: (1) EV charging infrastructure and electrical network; (2) regulator imposed limits; (3) financial constraints; (4) weather constraints; (5) Infrastructure Limitations; (6) EV owner satisfaction; and (7) constant current and constant voltage charging behavior of EV batteries, etc.

3.3.1. EV Charging infrastructure and Electrical Network

Electrical infrastructure limits are the limits enforced because of the limitations of the power grid. A prominent example of this constraint would be the maximum power that can be imported from the electric grid. Other limitations on the part of the infrastructure could be from the DERs themselves. On-site generation from DERs generally cannot be greater than the rated power. Batteries should not charge or discharge above or below a certain limit. Electrical power and demand needs to be balanced at all the time steps. This is the power demand balance that follows from the fundamentals of electrical power engineering:

$$|P_{import}^{Grid}| \leq P_{gridlimit} \quad \forall\, t \in \mathcal{T}, \qquad \text{Eq. 1}$$

$$P_{DERs} \leq P_{DERs}^{UpperLimit} \quad \forall\, t \in \mathcal{T}, \qquad \text{Eq. 2}$$

$$P_{DERs} \geq P_{DERs}^{LowerLimit} \quad \forall\, t \in \mathcal{T}, \qquad \text{Eq. 3}$$

$$P_{Load}^{Facility} + \sum_{charger,type} P_{Charger,type} = \qquad \text{Eq. 4}$$
$$\sum_{DERs} P_{DERs} \pm \sum_{Battery} P_{Battery} \pm P_{import}^{Grid} \quad \forall\, t \in \mathcal{T}$$

$$P_{Battery}^{Min} \leq P_{Battery} \leq P_{Battery}^{Max} \quad \forall\, t \in \mathcal{T} \qquad \text{Eq. 5}$$

$$P_{charger,type} = S_{charger,type} P_{charger,type}^{rated} \quad \forall\, t \in \mathcal{T} \qquad \text{Eq. 6}$$

3.3.2. Regulator Imposed Limits

The regulator-imposed limits in the example embodiment comprise each of the following.

3.3.2.1. Emission Limit

The other limits could be on the amount of CO2 that can be emitted from the DERs on an annual basis. Different regulatory bodies will have different quantities on these limits. The user 12 may then key in these limits when modeling. This can be framed mathematically as, Emissions=
$$\Sigma_{DERs, t \in T} \text{Emission}_{marginal_{DERs}} * \text{Capacity}_{DERs}$$

Emissions≤Emission$_{limit}$ Eq. 7 where Emission$_{limit}$ is the limit entered by the user in the input.

3.3.2.2. Energy Export Limits

The amount of electrical energy that can be exported to the utility is limited, the constraint can be mathematically stated as:

$$P_{export} \leq P_{export}^{Max} \qquad \text{Eq. 8}$$

3.3.2.3. Total DER Capacity

The total installed capacity of DERs should not be greater than a certain percentage of the total annual load:

$$\Sigma_{Hours, Days, Months} \Sigma_{DERs} P_{DERs} \leq \beta \Sigma \text{Hours,Days,} \\ \text{MonthsLoad}$$

$$0 \leq \beta \leq 1 \qquad \text{Eq. 9}$$

3.3.3. Financial Constraints and Business Models

Similarly, the financial constraints like limits on budget spending needs to be enforced. Since these limits are different for each facility, the limits are keyed in as inputs by each facility. Financial constraints also include cost recovery from users, the market prices for EV charging, to ensure the competitiveness of the project. Targeted profits on investments can be included as a lower limit on the profits to ensure that the optimal planning can achieve these targets depending on the specific business models (e.g., high level categories of free service, subsidized service and for-profit service).

$$\sigma = \text{EVcharging price}_{Marginal} - \text{Energycost}_{Marginal} \qquad \text{Eq. 10}$$

For values σ<0, the facility incurs losses on the project. In which case. EV charging could be provided as a free service or subsidized service, the loss is absorbed by the facility.

For σ>0, the facility makes profits on providing EV charging as a service by charging users for charging their EVs.

3.3.4. Weather Constraints

Weather limits power generation from renewable energy resources. For example, solar insolation affects PV outputs, while wind speeds can be a limiting factor for the energy that can be generated in wind generators. Ambient temperatures can impact power flows in distribution circuits. It also plays an important role in the overall budget as high temperature impacts the rating of transformers and hence affects the overall capital costs.

The weather also affects the consumption of electrical energy. In winter season the load on the system increases as well as the energy required for electrical transportation. The state of charge upon arrivals is also lower due to the lower temperatures and this creates increased charging loads.

During winter charging, load can be assumed to be marginally increased by an amount alpha:

EVcharging load$_{winter}$=αCharging$_{Load}$ $$1 \leq \alpha \qquad \text{Eq. 11}$$

Facilityload$_{winter}$=γFacilityload $$1 \leq \gamma \qquad \text{Eq. 12}$$

3.3.5. Infrastructure Site Limitations 3.3.5.1. Parking Spots

Charger installations are constrained by the number of parking spots or space constraints in the facility premises. These infrastructure limitations are keyed in by the user that needs to be respected when designing the optimal EV charging facilities together with DERs. Similarly, space can also affect the DER installations.

$$\Sigma_{Parkingspots,chargers} N(Chargers) \leq \text{parking spots} \quad \text{Eq. 13}$$

Another limitation may comprise the space available for the vehicles to wait in a line. This is critical for gas stations and road side charging.

3.3.5.2. DER Related Other Constraints

The installation of PV panel requires substantial spatial area.

Usually, the area occupied by installed PV panels is limited by the area:

$$\text{area}_{PV} \leq \text{area}_{PV}^{max} \quad \text{Eq. 14}$$

Additional area may be required for battery storage.

3.3.6. EV Owner Satisfaction

The satisfaction of the EV owners is largely determined by the waiting time and queue length. These can be stated as a constraint, $$\text{Waitingtime} \leq \text{Waitingtime}_{Max}$$

$$\text{Queuelength} \leq \text{Queuelength}_{Max}, \Delta t \in \mathcal{T}$$

$$\text{Servicetime} \leq \text{Servicetime}_{Max} \quad \text{Eq. 15}$$

Some of the customer satisfaction constraints might be relaxed if the service is free or subsidized. Waiting time is defined as the time spent in waiting to get hooked onto an electric charger. This arises because of smart EV charge scheduling, in which not every vehicle will charge as soon as they arrive and are connected to a charging station. Queue length, is the quantitative description of the cars waiting in the line to receive a charge in their batteries. The queue length is an important constraint the number of cars increases the spatial requirements; in addition a large queue can also result in a larger portion of lost business.

3.3.7. EV battery charging characteristics—Constant current and constant voltage charging behavior. The EV charging process is divided into two sequential stages: 1) constant current; and 2) constant voltage, to better describe the actual charging process of the EV batteries in the future operation scenarios. At the constant current stage, the charging power of the EV is comparatively high and stable, while, at the constant voltage stage, the charging power of the EV will reduce with the SoC of the battery. As a result, when the SoC of the EV is low, it will get charged at the constant current stage with high speed; when the SoC gets close to 100% SoC, it will get charged at the constant voltage stage with low speed.

4. Discrete Event Simulator

Traffic statistics are fed to both the optimizer 18b and the discrete event simulator 18c, as seen in FIG. 4A through FIG. 4C. Traffic statistics include vehicle arrival statistics, vehicle departure statistics, the arrival SOC for each EV, the desired SOC for each EV, and EV type. Traffic statistics are used to generate individual vehicle level data through a traffic data simulator.

The discrete-event simulator simulates service using the number and type of chargers suggested by the optimizer. A single queue, multiple-server model is simulated. The discrete-event simulator also takes into account a statistic on customer impatience— a behavioral factor that may prompt a customer to withdraw from the service queue. Another stochastic parameter is the interchange time (transition time): the time interval between the instant a charger finishes charging, and the time instant when it begins charging the next vehicle.

The discrete-event simulator is run multiple times, each time with a new set of inputs from traffic statistics. Cumulative results report on waiting times, charging times, charger usages, power requirements, departure SOCs, and other figures of interest to service providers and their customers.

The discrete-event simulator provides a fast means for simulating charging services. A naïve simulation might run through a sequence of fixed time intervals, taking cognizance of all events that may or may not happen; but our simulator jumps, at every step, to the very time instant (or milepost) at which the next significant event happens. This allows for fast simulation—especially during periods of low event density.

Traffic statistics are used to set up simulator mileposts. Additional simulator mileposts are set up using charger specifications provided by the optimizer. Mileposts are also generated internally from impatience data.

In a preferred embodiment, all outputs of interest are tabulated, and a GUI gathers in data from output tables and interprets and organizes it for display via interface 14b (FIG. 1).

5. Controlling Unit

The estimated results from the planning module 30 assumes optimal operation of the infrastructure. A key output from the planning module is the operation strategy (optimal operating schedule). An optimally designed infrastructure can only guarantee optimal results when operated according to optimal operating schedule. This is ideally achieved using a controlling unit/module. The controlling module enhances the operation strategy provided by the long-term planner in real time using optimal control and real-time correction algorithms. Real time optimization is based on actual operations data and short-term forecasts. This helps adapt the optimal control strategy to the actual operating conditions.

Figure 6:
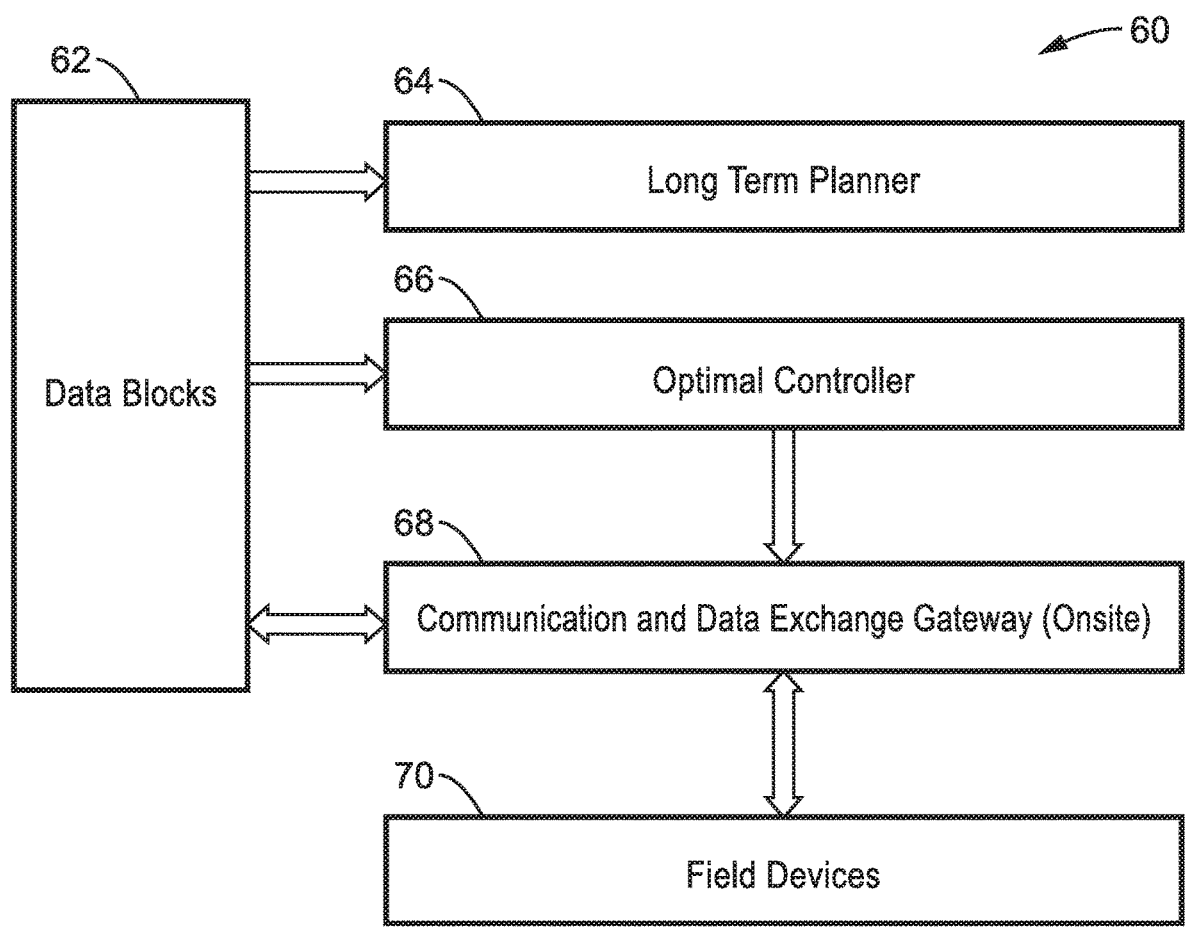
FIG. 6 is a high-level block diagram of a controlling unit according to an embodiment of the present disclosure.

FIG. 6 illustrates an exemplary high-level embodiment of a controlling unit 60 in accordance with the present disclosure. FIG. 6 provides an overview of the various components of the controlling unit 60 with the overall architecture showing data blocks 62 coupled to a long term planner 64, an optimal controller 66 (e.g., having different modules comprising: short term forecasting, rolling unit commitment, and optimal dispatch and error correction), and a data exchange unit/communication gateway 68, which is shown for receiving inputs from the optimal controller 66 and for communicating with field devices 70.

Figure 7:
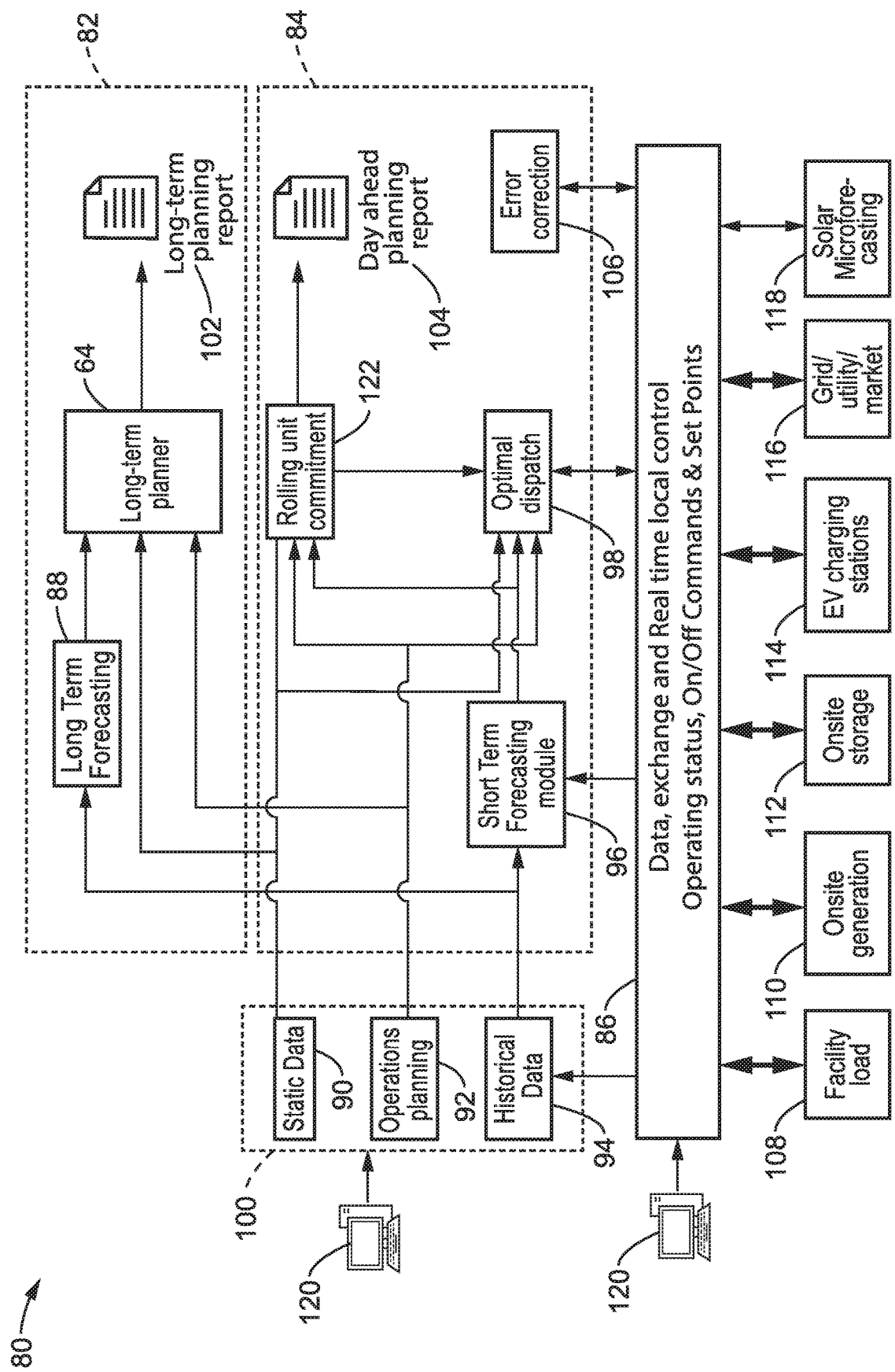
FIG. 7 is a detailed block diagram of a controlling unit according to an embodiment of the present disclosure.

FIG. 7 illustrates a more detailed embodiment of a controlling unit 80 comprising a software layer (e.g. "Software-as-a-service" or installed locally in a workstation) and a hardware layer that is installed onsite. The hardware layer functions as a real-time data exchange unit with the onsite infrastructure (DERs, Loads, EV charging stations). Local control functions are also embedded into this local hardware layer. The primary modules of controlling unit comprise the optimal controller 84, long term planner 82, and data blocks 100.

In more detail, the controlling unit 80 comprises of the following modules: (1) data block 100 (master data, operations data and historical data) seen to the left of the figure; (2) Long Term forecasting 88; (3) Long Term Planner 64; (4) Short Term Forecasting 96; (5) Rolling unit commitment 122; (6) Optimal dispatch 98; (7) Error correction 106; (8)

Solar Micro forecasting module 118; (9) Data exchange & Communication gateway 86 (In Cloud); and (10) Communication gateway and real time local control unit 86 (Onsite).

Data input/output is achieved via one or more computing devices 120.

5.1. Data Block

A data block 100 comprises a data repository that stores static data, historical operations data and actual operations data. It also may comprise data related to the operations strategy and management. This data block 100 forms the backbone of the controller 80 as all the modules within the control unit will use some or all of this data.

The data blocks 100 are primarily portioned into three data types, static data 90, data for operations planning 92, and historical data 94. Each of these data blocks contain data, that flows into the optimal planner or controller depending on the mode selected by the facility manager or the user. The static data block 90 generally contains all the data that is static throughout the process.

5.1.1. Static Data

The static data block 90 contains data such as, infrastructure facility, facility preferences, queue management strategies, EV data, DER specifications data, and financial data.

Infrastructure facility data may comprise: number of parking spots, existing EV chargers, their Number and rating, electrical infrastructure limits, existing DERs with numbers and size, Facility preference data may comprise: load management strategies, market participation instruments, grid availability and emissions, charger operating hours and queue management strategies, and algorithmic preferences.

Queue management strategies comprise: prioritization of customer groups.

EV data comprises: size and type of EV, battery models for EVs, and charger specifications.

DER specification data comprises technical characteristics and data for onsite generation and energy storage devices.

Financial data comprises: utility tariff information, and information on EV charging tariffs.

5.1.2. Operations Planning Data

Operations planning data 92 is related to how the facility is operated. This data could be related to how the load is handled in the facility or it could be concerning the management of EV charging queue in the facility. This data represents a majority of the decisions that the facility manager or the owner can make.

5.1.3. Historical Data

All the data that is liable to be forecasted at some point or another during the controlling process, becomes historical data 94. This data, including the historical data, is stored in the database section of the historical data. The data is used to improve forecasting in both the long term as well as the short term. With more and more historical data, the machine learning algorithms can improve on the accuracy of their prediction.

5.2. Long Term Forecasting Module

Long term forecasting module 88 uses data supplied by the data block 100 and weather data from meteorological data for creating long term forecasts of the following: (1) weather at the location; (2) output from onsite generation 110; (3) facility electrical load 108; (4) mobility behavior (e.g., demand for high speed charging, EV Arrival time, EV departure time, average SoC upon arrival or a statistical distribution of SoC upon arrival, average SoC upon departure or a statistical distribution of SoC upon departure, type and size of EVs); and (5) market prices for charging.

The long-term forecasting module 88 is configured for using machine learning algorithms and uses the available data from the historical data set to train these machine learning models. Once the model is trained, the predication can be made, the training of the model will be performed periodically whenever the data in the historical data block 94 is updated. The long-term forecasting module 88 will initially use the data from planning module 82 and will therefore have low accuracy. As new data start getting into the historical data set, the accuracy will improve.

5.3. Long-Term Planner

The long-term planner 64 uses output from the long-term forecasting module 88 and data from the data block 100 (static 90 and operations data 92) to generate planning spanning months to years ahead. In one embodiment, the long-term planner 64 uses Mixed Inter Linear programming or Mixed Integer Conic Programming using inputs from the long-term forecasting module 88, infrastructure data and operations strategy data. The module provides a set of reports 102 as an output.

The long-term planner 64 enables the operator to evaluate different operating conditions and plan long term operating strategy, such as infrastructure and/or business model changes.

5.4. Optimal Controller

The optimal controller 84 is a module that performs two primary functions. First, it provides a day ahead commitment schedule 104 (deciding which units must be operated/used) of the DERs and EV chargers based on a projected demand. In addition, the optimal controller 84 reoptimizes the committed devices and dispatches field devices periodically, such as every 5-15 minutes. The error correction unit 106 provides last minute corrections based on real-time feedback from the field. The optimal controller 84 preferably includes the following sub modules: short term forecasting module 96, rolling unit commitment 122, optimal dispatch 98 and error correction unit 106. In a preferred embodiment, the optimal controller algorithm optimizes the operation based on individual vehicle data instead of aggregated data

5.5. Short Term Forecasting Module

The short-term planning module 96 forecasts data for a short period of time, for example for the next 5-15 minutes. The main aim of the short-term forecasting module 96 is to forecast data that could vary within short intervals of time. The main reason for having this module is to improve the workings of the controller 80, in terms of accounting for the data in real time. Since the optimal controller 80 cannot generally be run in real time, the system forecasts data for next few minutes to improve on the accuracy of the data used in optimal control toward obtaining the best expected value.

The short term forecasting module 96 uses data supplied by the data block, weather data and actual operations in data (through data exchange and real-time control unit 86) for creating short term forecasts of the following: (1) solar irradiance; (2) output from onsite generation 110 (renewable); (3) facility load 108; (4) mobility behavior (e.g., demand for high speed charging, EV Arrival time/arrival rate, EV departure time, Average SoC upon arrival or a statistical distribution of SoC upon arrival, Average SoC upon departure or a statistical distribution of SoC upon departure), customer identification and customer preferences; and (5) market prices for charging.

Both the planner and controller algorithms use weather forecast from meteorological agencies to forecast the level of solar PV production at different times of the day. This forecast however does not take into account impact of short time variations due to slow and fast-moving clouds. Studies indicate that these cloud movements could alter the level of solar PV output significantly.

This problem is addressed by including a short term solar irradiance forecasting system in the controller algorithm. The short-term forecast system based on infra-red imaging of the sun through a multiple camera unit and LAPART neural networks (machine learning) provides 5 seconds to 5-minute forecasts of solar irradiance that can be integrated with control system for model predictive controls. The model predictive controller can then adjust the EV charging schedule accordingly—e.g. by on/off controls or through altering the charging rate. The output from the solar micro forecasting module 118 is used by short term forecasting module 96, optimal controller 84 and error correction modules 106.

5.6. Rolling Unit Commitment Module

The rolling unit commitment module 122 uses data from data block 100 (static and operations data) and short-term forecasting module 96 to generate planning (e.g., 24 hours ahead) on a rolling basis. It provides an hourly on/off schedule for the EV chargers 114, on site generators 110 and energy storage devices 112 that may be present on grid 116. This is the equivalent of unit commitment in power system operations planning. This data is used by the optimal controller 84 for generating control signals. The day/week ahead planner 104 also provides a report to the facility operator for planning purposes.

The rolling unit commitment 122 runs for every 24-hour period, using the latest inputs from the forecasting module 96 to make changes to the optimal unit commitment of EV chargers 114, onsite generation 110 and storage devices 112. Continuous operation in running the rolling unit commitment model is a key to getting updated unit commitment, which helps manage large variability in EV charging demand together with stochasticity in renewable power generation.

The commitment model is a Mixed Integer model and runs every hour for the next 24 hours as the time horizon. The model can be made robust to the stochasticity in EV mobility behavior and renewable generation.

The rolling unit commitment 122 runs the optimization algorithm that is used for optimal design and planning of EV charging stations 114 together with DERs. The type of formulation is a Mixed Integer problem. Depending on the choice of the algorithm it could be Mixed Integer Linear Program or Mixed Integer Conic Program (Second Order Conic) for stochastic modeling. The planner's algorithm can be deterministic or stochastic. The choice of the algorithm is largely dependent on the choice made by the user. The user chooses the algorithm that he runs, in the input pertaining to user's algorithmic preferences. If the chosen algorithm is deterministic it would be that the problem is now Mixed Integer Linear Program, if stochastic nature of some of the variables are considered the problem would be Mixed Integer Convex.

The algorithmic preferences may also define some of the settings the solver chooses, or it may also be related to the choice of the solver to be used when solving the problem. For example, it could be optimality tolerances, cut settings for MIP.

The optimization problem is configured to have an optimization function also called the objective function; the objective function can be a weighted sum of annualized capital costs and the end user convenience. The annualized capital costs include the annualized capital cost of DERs, EV charging stations, any infrastructure upgrades. The weights for these objective functions could be adjusted by the user. The user also has the option of choosing another objective function, wherein the maximum number of chargers that can be installed will be calculated within the constraints if there is no upgrade.

The module supports two different algorithms. The preference to these algorithms depends on the choice made by the user. The first one is deterministic where uncertainty in any of the parameters is not considered when modeling the system. The second one is the stochastic version, in which the algorithms account for the uncertainty in some of the parameters like EV arrival time, departure time and so forth.

The optimal planner has two different objective functions, we describe them in detail here, Minimize $\mu_1$*Financial (operational cost, for the day) and Maximize $\mu_2$*customer satisfaction (queuelength, waitingtime, unfulfilleddemand, for the day)

5.7. Constraints

The optimal planner, provides the best solution within the limits of following constraints: EV charging infrastructure and electrical network, regulator-imposed limits, financial constraints, weather constraints, infrastructure limitations, and EV owner satisfaction.

6. General Scope of Embodiments

The enhancements described in the presented technology can be readily implemented within various levels of charging system infrastructure coupled with one or more computer processor platforms. It should also be appreciated that the EV charging infrastructure is implemented at various levels to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with EV charging within its infrastructure. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depiction described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for configuration and control of Electric Vehicle (EV) charging infrastructure, the apparatus comprising: (a) a processor; and (b) a non-transitory memory storing instructions executable by the processor; (c) wherein said instructions, when executed by the processor, perform steps comprising: (i) receiving user input data associated with one or more parameters of an EV charging infrastructure; (ii) storing inputs as system data for various aspects of the EV charging infrastructure configuration; (iii) submitting the system data to an optimal planning module; which is configured for performing optimization based on objectives in view of a set of constraints; and (iv) generating a recommendation from the optimal planning module for the custom EV charging infrastructure based on one or more factors comprising: charging needs, behavior of EV end users, interchange time and cost, instances of impatience, waiting time, and penalty for unfulfillment both at an aggregated demand level and at an individual vehicle level.

2. The apparatus or method of any of the preceding or subsequent embodiments, wherein said instructions when executed by the processor are further configured for performing steps comprising: (v) validating the recommendation from the optimal planning module using a discrete event-based simulator to assess the extent of queuing characteristics present in the EV charging infrastructure configuration and if needed adjust the recommendation from the optimal planning module to minimize issues determined from the simulator; and (vi) generating one or more charging schedules via a controlling module for custom EV charging based on one or more input parameters.

3. The apparatus or method of any of the preceding or subsequent embodiments, wherein the queuing characteristics are selected from the group comprising: waiting time, queue length, impact of interchange or transition times, and instances of impatience.

4. The apparatus or method of any of the preceding or subsequent embodiments, wherein the one or more input parameters are selected from the group comprising: EV facility infrastructure, EV facility preferences, EV mobility behavior and preferences, EV end user preferences, EV data, distributed energy resource (DER) specifications, utility and market data, weather data, master data, financial data, business model data.

5. The apparatus or method of any of the preceding or subsequent embodiments, wherein said instructions when executed by the processor are configured to generate the recommendation by generating solutions in response to mathematical models, machine learning, and convex optimization to determine optimal component sizes and control set-points within the EV charging infrastructure.

6. The apparatus or method of any of the preceding or subsequent embodiments, wherein said instructions when executed by the processor are configured to generate the recommendation by utilizing objective functions to support a selected objective optimization goal with respect to the EV charging infrastructure.

7. The apparatus or method of any of the preceding or subsequent embodiments, wherein said objective function comprises a deterministic algorithm in which uncertainty in any input parameters is not considered when modeling the system.

8. The apparatus or method of any of the preceding or subsequent embodiments, wherein said objective function comprises a stochastic algorithm that accounts for uncertainty in at least a portion of the input parameters.

9. The apparatus or method of any of the preceding or subsequent embodiments, wherein said instructions when executed by the processor are configured to generate the recommendation for the EV charging infrastructure via generating outputs selected from the group of outputs comprising: financial data output, technical operations data output, and business model data output.

10. The apparatus or method of any of the preceding or subsequent embodiments, wherein said financial output is selected from the group of financial data outputs comprising: investment decisions, type, number and size of EV chargers in the EV charging infrastructure, investment for EV charging infrastructure upgrades, annualized investment cost of the EV charging infrastructure, and operating costs of the EV charging infrastructure.

11. The apparatus or method of any of the preceding or subsequent embodiments, wherein said technical operations data output is selected from the group of technical operations data outputs comprising: per unit time load profile for EV facility load with contribution from residential load and each EV charger load, charger utilization, queue length, queue waiting time and space usage statistics as a function of unit time for an individual EV being charged, and fulfilled and unfulfilled charging requirements.

12. The apparatus or method of any of the preceding or subsequent embodiments, wherein said business model data output is selected from the group of business model data outputs comprising: suggested pricing schemes, financial analysis of the EV charging infrastructure, cash flow with respect to the EV charging infrastructure, and net present value of the EV charging infrastructure.

13. The apparatus or method of any of the preceding or subsequent embodiments, wherein the one or more input parameters are selected from the group comprising: battery capacity, state of charge upon arrival, facility operating hours, queue management strategy, queue length, waiting time, and transition time.

14. The apparatus or method of any of the preceding or subsequent embodiments, wherein said charging schedules are generated from the controlling module based on short term forecasting, rolling unit commitment, optimal dispatch and error correction for generating a custom EV charging profile; and wherein the custom EV charging profile is generated based on one or more input parameters are selected from the group comprising: weather conditions, EV charging needs, EV queue management strategy, cost of energy, pricing strategy, and behavior of EV end users to minimizing operating cost of the EV charging infrastructure.

15. The apparatus or method of any of the preceding or subsequent embodiments, wherein the optimal planning module comprises a pre-processing module that processes the one or more input parameters and outputs an aggregated or individual EV charging demand profile for input by an optimization module.

16. The apparatus or method of any of the preceding or subsequent embodiments, wherein the EV charging demand profile is adjusted for statistical variance.

17. The apparatus or method of any of the preceding or subsequent embodiments, wherein the pre-processing module further generates one or more facility profiles.

18. A method for configuration and control of an Electric Vehicle (EV) charging infrastructure, the apparatus comprising: receiving user input data associated with one or more parameters of an EV charging infrastructure; storing inputs as system data for various aspects of the EV charging infrastructure configuration; submitting the system data to an optimal planning module; which is configured for performing optimization based on objectives in view of a set of constraints; and generating a recommendation from the optimal planning module for the custom EV charging infrastructure based on one or more factors comprising: charging needs, behavior of EV end users, interchange time and cost, instances of impatience, waiting time, and penalty for unfulfillment both at an aggregated demand level and at an individual vehicle level; wherein said method is performed by a processor executing instructions stored on a non-transitory medium.

19. The apparatus or method of any of the preceding or subsequent embodiments, wherein said instructions when executed by the processor are further configured for performing steps comprising: validating the recommendation from the optimal planning module using a discrete event-based simulator to assess the extent of queuing characteristics present in the EV charging infrastructure configuration and if needed adjust the recommendation from the optimal planning module to minimize issues determined from the simulator; and generating one or more charging schedules via a controlling module for custom EV charging based on one or more input parameters.

20. The apparatus or method of any of the preceding or subsequent embodiments, wherein the queuing characteristics are selected from the group comprising: waiting time, queue length, impact of interchange or transition times, and instances of impatience.

21. The apparatus or method of any of the preceding or subsequent embodiments, wherein the one or more input parameters are selected from the group comprising: EV facility infrastructure, EV facility preferences, EV mobility behavior and preferences, EV end user preferences, EV data, distributed energy resource (DER) specifications, utility and market data, weather data, master data, financial data, business model data.

22. The apparatus or method of any of the preceding or subsequent embodiments, wherein generating the recommendation comprises generating solutions in response to mathematical models, machine learning, and convex optimization to determine optimal component sizes and control set-points within the EV charging infrastructure.

23. The apparatus or method of any of the preceding or subsequent embodiments, wherein generating the recommendation comprises generating the recommendation by utilizing objective functions to support a selected objective optimization goal with respect to the EV charging infrastructure.

24. The apparatus or method of any of the preceding or subsequent embodiments, wherein said objective function comprises a deterministic algorithm in which uncertainty in any input parameters is not considered when modeling the system.

25. The apparatus or method of any of the preceding or subsequent embodiments, wherein said objective function comprises a stochastic algorithm that accounts for uncertainty in at least a portion of the input parameters.

26. The apparatus or method of any of the preceding or subsequent embodiments, wherein generating the recommendation comprises generating outputs selected from the group of outputs comprising: financial data output, technical operations data output, and business model data output.

27. The apparatus or method of any of the preceding or subsequent embodiments, wherein said financial output is selected from the group of financial data outputs comprising: investment decisions, type, number and size of EV chargers in the EV charging infrastructure, investment for EV charging infrastructure upgrades, annualized investment cost of the EV charging infrastructure, and operating costs of the EV charging infrastructure.

28. The apparatus or method of any of the preceding or subsequent embodiments, wherein said technical operations data output is selected from the group of technical operations data outputs comprising: per unit time load profile for EV facility load with contribution from residential load and each EV charger load, charger utilization, queue length, queue waiting time and space usage statistics as a function of unit time for an individual EV being charged, and fulfilled and unfulfilled charging requirements.

29. The apparatus or method of any of the preceding or subsequent embodiments, wherein said business model data output is selected from the group of business model data outputs comprising: suggested pricing schemes, financial analysis of the EV charging infrastructure, cash flow with respect to the EV charging infrastructure, and net present value of the EV charging infrastructure.

30. The apparatus or method of any of the preceding or subsequent embodiments, wherein the one or more input parameters are selected from the group comprising: battery capacity, state of charge upon arrival, facility operating hours, queue management strategy, queue length, waiting time, and transition time.

31. The apparatus or method of any of the preceding or subsequent embodiments, wherein said charging schedules are generated from the controlling module based on short term forecasting, rolling unit commitment, optimal dispatch and error correction for generating a custom EV charging profile; and wherein the custom EV charging profile is generated based on one or more input parameters are selected from the group comprising: weather conditions, EV charging needs, EV queue management strategy, cost of energy, pricing strategy, and behavior of EV end users to minimizing operating cost of the EV charging infrastructure.

32. The apparatus or method of any of the preceding or subsequent embodiments, wherein the optimal planning module comprises a pre-processing module that processes the one or more input parameters and outputs an aggregated or individual EV charging demand profile for input by an optimization module.

33. The apparatus or method of any of the preceding or subsequent embodiments, the EV charging demand profile is adjusted for statistical variance.

34. The apparatus or method of any of the preceding or subsequent embodiments, wherein the pre-processing module further generates one or more facility profiles.

35. An apparatus for design and control of Electric Vehicle (EV) charging infrastructure, the apparatus comprising: (a) a processor; and (b) a non-transitory memory storing instructions executable by the processor; (c) wherein said instructions, when executed by the processor, perform steps comprising: (i) receiving user direction and inputs regarding a custom EV charging infrastructure; (ii) storing inputs as system data for various aspects of the EV charging infrastructure design; (iii) submitting the system data to an optimal planner which is configured for performing optimization based on objectives in view of a set of constraints; (iv) generating a recommendation from the optimal planner for the custom EV charging infrastructure based on charging needs and behavior of the consumers toward deferring upgrades in electric infrastructure without compromising energy required for electrical transportation; (v) validating/refining the results from the optimal planner using discrete event based simulator; and (vi) generating charging schedules from the controlling module for custom EV charging based on information about EV data, distributed energy resource (DER), and the electric infrastructure without compromising energy required for electrical transportation and causing undue impact on the electrical infrastructure.

36. The apparatus or method of any of the preceding or subsequent embodiments, wherein inputs for various aspects of the EV charging infrastructure design are selected from the group of aspects consisting of infrastructure at the facility, facility preferences, mobility behavior and preferences, end user preferences, EV data, distributed energy resource (DER) specifications, utility and market data, weather data, master data, financial data, business model data, and any combinations thereof.

37. The apparatus or method of any of the preceding or subsequent embodiments, wherein said instructions when executed by the processor are configured for perform steps of said optimal planner comprising generating solutions in response to mathematical models, machine learning, and convex optimization to determine the optimal component sizes and control set-points.

38. The apparatus or method of any of the preceding or subsequent embodiments, wherein said instructions when executed by the processor are configured for performing steps of said optimal planner for utilizing objective functions to support a selected objective optimization goal.

39. The apparatus or method of any of the preceding or subsequent embodiments, wherein said instructions when executed by the processor are configured for performing steps of said optimal planner in which said objective function comprises a deterministic algorithm in which uncertainty in any of the parameters is not considered when modeling the system.

40. The apparatus or method of any of the preceding or subsequent embodiments, wherein said instructions when executed by the processor are configured for performing steps of said optimal planner in which said objective function comprises a stochastic algorithm which accounts for uncertainty in at least a portion of the parameters.

41. The apparatus or method of any of the preceding or subsequent embodiments, wherein said instructions when executed by the processor are configured for performing steps of generating a recommendation from the optimal planner and the discrete event simulator for the custom EV charging infrastructure comprising generating outputs selected from the group of outputs consisting of financial data output, technical operations data output, business model data output, and any combination thereof.

42. The apparatus or method of any of the preceding or subsequent embodiments, wherein said financial output is selected from the group of financial data outputs consisting of investment decisions, type and number and size of EV chargers, investment for infrastructure upgrades, annualized investment cost, hourly and monthly and daily and annual operating costs and energy bill estimates, and any combination thereof.

43. The apparatus or method of any of the preceding or subsequent embodiments, wherein said technical operations data output is selected from the group of technical operations data outputs consisting of per unit time load profile for facility load with contribution from residential load and each EV charger load, charger utilization, queue length and queue waiting time and space usage statistics as a function of unit time for an individual EV being charged, fulfilled and unfulfilled charging requirements, and any combination thereof.

44. The apparatus or method of any of the preceding or subsequent embodiments, wherein said business model data output is selected from the group of business model data outputs consisting of suggested pricing schemes, financial analysis of the EV infrastructure project, cash flow, net present value, and any combination thereof.

45. The apparatus or method of any of the preceding or subsequent embodiments, wherein said generating a recommendation from the optimal planner and the discrete event simulator for the custom EV charging infrastructure based on charging needs based on information selected from the group of EV charging information consisting of battery capacity, state of charge upon arrival, state of charge required upon departure, facility operating hours, queue management strategy, queue length, waiting time, transition time, and any combination thereof.

46. The apparatus or method of any of the preceding or subsequent embodiments, wherein said charging schedules are generated from the controlling module based on short term forecasting, rolling unit commitment, optimal dispatch and error correction units for custom EV charging based on weather conditions, charging needs for the vehicles, queue management strategy, cost of energy, pricing strategy, and behavior of consumers toward minimizing operating cost of the electric infrastructure without compromising energy required for electrical transportation and causing adverse impact on the electrical network.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Code for Charging Simulation

```
# -*- coding: utf-8 -*-
"""
# EV Charging. Phase One

# A car may be an EV with a probability specified in
#   EVSimUserInputs9.

# """
import simpy
import numpy as np
import random
import csv
import pandas as pd
path = '/Users/dakkumar/Desktop/ArunsPythonCode/0 simpy Arun/'
userInputsFile = 'EVSimUserInputs9.xlsx'
resultsFile    = 'EVSimResults.csv'
#arrivalPoissonMean = 1.0   # Poisson mean of interarrival intervals
# charginPoissonMean = 10.0   # Poisson mean of charging intervals
#constrainedTime   = True   # When True, charging only during office hours
#interchangeDelayEnabled = True   # When True, interchange delay is enabled
randomSeed = 42
epsilon   = 0.00001
level1debug = False
level2debug = False
level3debug = False
# Number of columns in the results array
nCols           = 17    # Coulmns of information per customer
# Assignments for columns in the results array
C_car             = 0
C_arrival_time    = 1
```

TABLE 1-continued

Code for Charging Simulation

```
C_wait_interval        = 2
C_charger              = 3
C_charging_start_time  = 4
C_charging_end_time    = 5
C_charging_interval    = 6
C_interchange_interval = 7
C_rollover_interval    = 8
C_rollover_end_time    = 9
C_model                = 10
C_batCap               = 11
C_arrSOC               = 12
C_desDepSOC            = 13
C_actualDepSOC         = 14
C_wasCustImpatient     = 15
C_car_only_partially_charged = 16
# Dataframe location assignments for user inputs sheet
I_Model1_prob      = [23,1]
I_Model2_prob      = [24,1]
I_Model3_prob      = [25,1]
I_Model4_prob      = [26,1]
I_Model5_prob      = [27,1]
I_Model1_batCap    = [23,2]
I_Model2_batCap    = [24,2]
I_Model3_batCap    = [25,2]
I_Model4_batCap    = [26,2]
I_Model5_batCap    = [27,2]
I_Model1_minArrSOC = [23,3]
I_Model2_minArrSOC = [24,3]
I_Model3_minArrSOC = [25,3]
I_Model4_minArrSOC = [26,3]
I_Model5_minArrSOC = [27,3]
I_Model1_maxArrSOC = [23,4]
I_Model2_maxArrSOC = [24,4]
I_Model3_maxArrSOC = [25,4]
I_Model4_maxArrSOC = [26,4]
I_Model5_maxArrSOC = [27,4]
I_Model1_minDepSOC = [23,5]
I_Model2_minDepSOC = [24,5]
I_Model3_minDepSOC = [25,5]
I_Model4_minDepSOC = [26,5]
I_Model5_minDepSOC = [27,5]
I_charger_L1_nos   = [30,1]
I_charger_L2_nos   = [31,1]
I_charger_L3_nos   = [32,1]
I_charger_L1_power = [30,2]
I_charger_L2_power = [31,2]
I_charger_L3_power = [32,2]
I_charger_L1_start = [30,3]
I_charger_L2_start = [31,3]
I_charger_L3_start = [32,3]
I_charger_L1_stop  = [30,4]
I_charger_L2_stop  = [31,4]
I_charger_L3_stop  = [32,4]
I_inter_applicable = [35,1]
I_inter_min        = [35,2]
I_inter_max        = [35,3]
I_impat_allowed    = [38,1]
I_impat_proportion = [38,2]
I_impat_min        = [38,3]
I_impat_max        = [38,4]
I_prob_ev          = [41,1]
def debugPrintResults (resultsArray):
    """ Printing results for debugging. Usually turned off. """
    np.set_printoptions(formatter={'float': lambda x: "{0:0.2f}".format(x)})
    if level1debug:
        print 'resultsArray = '
        print resultsArray
    return
# fed debugPrinResults( )
def readUserData( ):
    """ Read xl file generated by a user. """
    # Read dataframe from the user inputs sheet
    df = pd.read_excel(path + userInputsFile)
    # Read the probability that an arriving vehicle is an ev
    # I_... is the location 2-tuple in th einput file
    prob_ev = df.iloc[I_prob_ev[0], I_prob_ev[1]]
    print '********* prob_ev = ', prob_ev
    # For every 15 minute interval,
```

TABLE 1-continued

Code for Charging Simulation

```
# Read the min and max number of EVs expected.
#global minNumArrivals, maxNumArrivals
minNumArrivals = [ ]
for row in range(3,11):
    for col in range(1,13):
        #minNumArrivals.append(df.iloc[row,col])
        minNumArrivals.append(df.iloc[row, col] * prob_ev)
maxNumArrivals = [ ]
for row in range(13,21):
    for col in range(1,13):
        #maxNumArrivals.append(df.iloc[row,col])
        maxNumArrivals.append(df.iloc[row, col] * prob_ev)
print 'minNumArrivals = ', minNumArrivals
print 'maxNumArrivals = ', maxNumArrivals
# Set up a list of 96 numbers: the number of 15 minute intervals in a day.
# Every entry in the list is the number of minutes past midnight
# That marks the beginning time of an individual interval.
intervalStartTime = 0    # In minutes from midnight.
#global arrIntervalsStartTimesList
arrIntervalsStartTimesList = [ ]
for index in range(96):
    arrIntervalsStartTimesList.append(intervalStartTime)
    intervalStartTime += 15
# Add one last number to close out arrIntervalsStartTimesList: 96*15 = 1440.
arrIntervalsStartTimesList.append(1440)
# Probability that a particular EV model comes in to charge
Model1_prob = df.iloc[I_Model1_prob[0], I_Model1_prob[1]]
Model2_prob = df.iloc[I_Model2_prob[0], I_Model2_prob[1]]
Model3_prob = df.iloc[I_Model3_prob[0], I_Model3_prob[1]]
Model4_prob = df.iloc[I_Model4_prob[0], I_Model4_prob[1]]
Model5_prob = df.iloc[I_Model5_prob[0], I_Model5_prob[1]]
#global Model_probs
Model_probs = [Model1_prob, Model2_prob, Model3_prob, Model4_prob, \
               Model5_prob]
# The battery capacities of all EV models
Model1_batCap = df.iloc[I_Model1_batCap[0], I_Model1_batCap[1]]
Model2_batCap = df.iloc[I_Model2_batCap[0], I_Model2_batCap[1]]
Model3_batCap = df.iloc[I_Model3_batCap[0], I_Model3_batCap[1]]
Model4_batCap = df.iloc[I_Model4_batCap[0], I_Model4_batCap[1]]
Model5_batCap = df.iloc[I_Model5_batCap[0], I_Model5_batCap[1]]
#global Model_batCaps
Model_batCaps = [Model1_batCap, Model2_batCap, Model3_batCap, \
                 Model4_batCap, Model5_batCap]
# The min SOC on arrival, all EV models
Model1_minArrSOC = df.iloc[I_Model1_minArrSOC[0], I_Model1_minArrSOC[1]]
Model2_minArrSOC = df.iloc[I_Model2_minArrSOC[0], I_Model2_minArrSOC[1]]
Model3_minArrSOC = df.iloc[I_Model3_minArrSOC[0], I_Model3_minArrSOC[1]]
Model4_minArrSOC = df.iloc[I_Model4_minArrSOC[0], I_Model4_minArrSOC[1]]
Model5_minArrSOC = df.iloc[I_Model5_minArrSOC[0], I_Model5_minArrSOC[1]]
#global Model_minArrSOC
Model_minArrSOC = [Model1_minArrSOC, Model2_minArrSOC, Model3_minArrSOC, \
                   Model4_minArrSOC, Model5_minArrSOC]
# The max SOC on arrival, all EV models
Model1_maxArrSOC = df.iloc[I_Model1_maxArrSOC[0], I_Model1_maxArrSOC[1]]
Model2_maxArrSOC = df.iloc[I_Model2_maxArrSOC[0], I_Model2_maxArrSOC[1]]
Model3_maxArrSOC = df.iloc[I_Model3_maxArrSOC[0], I_Model3_maxArrSOC[1]]
Model4_maxArrSOC = df.iloc[I_Model4_maxArrSOC[0], I_Model4_maxArrSOC[1]]
Model5_maxArrSOC = df.iloc[I_Model5_maxArrSOC[0], I_Model5_maxArrSOC[1]]
#global Model_maxArrSOC
Model_maxArrSOC = [Model1_maxArrSOC, Model2_maxArrSOC, Model3_maxArrSOC, \
                   Model4_maxArrSOC, Model5_maxArrSOC]
# The min SOC on departure, all EV models
Model1_minDepSOC = df.iloc[I_Model1_minDepSOC[0], I_Model1_minDepSOC[1]]
Model2_minDepSOC = df.iloc[I_Model2_minDepSOC[0], I_Model2_minDepSOC[1]]
Model3_minDepSOC = df.iloc[I_Model3_minDepSOC[0], I_Model3_minDepSOC[1]]
Model4_minDepSOC = df.iloc[I_Model4_minDepSOC[0], I_Model4_minDepSOC[1]]
Model5_minDepSOC = df.iloc[I_Model5_minDepSOC[0], I_Model5_minDepSOC[1]]
#global Model_minDepSOC
Model_minDepSOC = [Model1_minDepSOC, Model2_minDepSOC, Model3_minDepSOC, \
                   Model4_minDepSOC, Model5_minDepSOC]
# Chargers numbers for types L1, L2, L3
charger_L1_nos = df.iloc[I_charger_L1_nos[0], I_charger_L1_nos[1]]
charger_L2_nos = df.iloc[I_charger_L2_nos[0], I_charger_L2_nos[1]]
charger_L3_nos = df.iloc[I_charger_L3_nos[0], I_charger_L3_nos[1]]
#global charger_nos
charger_nos = [charger_L1_nos, charger_L2_nos, charger_L3_nos]
# Chargers numbers for types L1, L2, L3
charger_L1_power = df.iloc[I_charger_L1_power[0], I_charger_L1_power[1]]
```

TABLE 1-continued

Code for Charging Simulation

```
        charger_L2_power = df.iloc[I_charger_L2_power[0], I_charger_L2_power[1]]
        charger_L3_power = df.iloc[I_charger_L3_power[0], I_charger_L3_power[1]]
        #global charger_powers
        charger_powers = [charger_L1_power, charger_L2_power, charger_L3_power]
        # Charger start times for types L1, L2, L3
        charger_L1_start = df.iloc[I_charger_L1_start[0], I_charger_L1_start[1]]
        charger_L2_start = df.iloc[I_charger_L2_start[0], I_charger_L2_start[1]]
        charger_L3_start = df.iloc[I_charger_L3_start[0], I_charger_L3_start[1]]
        #global charger_startTimes
        charger_startTimes = [charger_L1_start, charger_L2_start, charger_L3_start]
        # Charger stop times for types L1, L2, L3
        charger_L1_stop = df.iloc[I_charger_L1_stop[0], I_charger_L1_stop[1]]
        charger_L2_stop = df.iloc[I_charger_L2_stop[0], I_charger_L2_stop[1]]
        charger_L3_stop = df.iloc[I_charger_L3_stop[0], I_charger_L3_stop[1]]
        #global charger_stopTimes
        charger_stopTimes = [charger_L1_stop, charger_L2_stop, charger_L3_stop]
        # Interchange parameters. Gaussian distribution
        inter_allowed = df.iloc[I_inter_applicable[0], I_inter_applicable[1]]
        inter_min   = df.iloc[I_inter_min[0], I_inter_min[1]]
        inter_max   = df.iloc[I_inter_max[0], I_inter_max[1]]
        #global interchangeParams
        interchangeParams = [inter_allowed, inter_min, inter_max]
        # Impatience parameters
        impat_allowed  = df.iloc[I_impat_allowed[0], I_impat_allowed[1]]
        impat_proportion = df.iloc[I_impat_proportion[0], I_impat_proportion[1]]
        impat_min = df.iloc[I_impat_min[0], I_impat_min[1]]
        impat_max = df.iioc[I_impat_max[0], I_impat_max[1]]
        #global impatienceParams
        impatienceParams = [impat_allowed, impat_proportion, impat_min, \
                            impat_max]
        # What charger is being used?
        if (charger_nos[0]>0):   chargerUsed = 0
        elif (charger_nos[1]>0): chargerUsed = 1
        else:                    chargerUsed = 2
#       chargrPower    = charger_powers [chargerUsed]
#       chrgrStartTime = charger_startTimes[chargerUsed]
#       chrgrStopTime  = charger_stopTimes[chargerUsed]
        # Check if all reads kosher
        if level1debug:
            print 'minNumArrivals   = ', minNumArrivals
            print 'maxNumArrivals   = ', maxNumArrivals
            print 'arrIntervalsStartTimesList = ', arrIntervalsStartTimesList
            print 'Model_probs      = ', Model_probs
            print 'Model_batCaps    = ', Model_batCaps
            print 'Model_minArrSOC  = ', Model_minArrSOC
            print 'Model_maxArrSOC  = ', Model_maxArrSOC
            print 'Model_minDepSOC  = ', Model_minDepSOC
            print 'charger_nos      = ', charger_nos
            print 'charger_powers   = ', charger_powers
            print 'charger_startTimes = ', charger_startTimes
            print 'charger_stopTimes  = ', charger_stopTimes
            print 'charger_nos      = ', charger_nos
            print 'charger_powers   = ', charger_powers
            print 'interchangeParams = ', interchangeParams
            print 'impatienceParams  = ', impatienceParams
        #fi
        return arrIntervalsStartTimesList, minNumArrivals, maxNumArrivals, \
            Model_probs, Model_batCaps, Model_minArrSOC, Model_maxArrSOC, \
            Model_minDepSOC, charger_nos, charger_powers, charger_startTimes, \
            charger_stopTimes, interchangeParams, impatienceParams, chargerUsed
#fed readUserData( )
def evData(nCars, Model_probs, Model_minArrSOC, Model_maxArrSOC, \
           Model_minDepSOC):
    """ Routine decides (1) kind of EV, (2) intial SOC, and
    (3) charge needed to top up. """
    if level2debug:
        print '- Inside evData ---'

#==========================================================================
==
#   print 'Model_prob   = ', Model_prob
#   print 'Model_batCap = ', Model_batCap
#   print 'Model_minArrSOC = ', Model_minArrSOC
```

TABLE 1-continued

Code for Charging Simulation

```
#     print 'Model_maxArrSOC = ', Model_maxArrSOC
#     print 'Model_minDepSOC = ', Model_minDepSOC

#================================================================================
      totalProb = sum(Model_probs)
      if totalProb != 1.0:   print 'Error. sum(Model_prob) != 1'
      # Calculate cumProbList
      total     = 0
      cumProbList = [ ]
      for index, prob in enumerate(Model_probs):
          total += Model_probs[index]
          cumProbList.append(total)
      # rof
      # Use cumProbList to generate modelsList
      modelsList = [ ]
      for index in range(nCars):
          toss = np.random.uniform(0., 1.)
          if toss  < cumProbList[0]: modelsList.append(1)
          elif toss < cumProbList[1]: modelsList.append(2)
          elif toss < cumProbList[2]: modelsList.append(3)
          elif toss < cumProbList[3]: modelsList.append(4)
          else:                     modelsList.append(5)
      # rof
      #print modelsList
      # Generate arrSOClist
      arrSOClist = [ ]
      for index in range(nCars):
          minimum = Model_minArrSOC[modelsList[index]-1]
          maximum = Model_maxArrSOC[modelsList[index]-1]
          value = np.random.uniform(minimum, maximum)
          arrSOClist.append(value)
      # rof
      #print arrSOClist
      # Generate desDepSOClist, the desired departure SOC
      desDepSOClist = [ ]
      for index in range(nCars):
          desDepSOClist.append(Model_minDepSOC[modelsList[index]-1])
      # rof
      print 'desDepSOClist = ', desDepSOClist
      return modelsList, arrSOClist, desDepSOClist
# fed evData( )
def calculateArrivalTimes(minNumArrivals, maxNumArrivals, \
                          arrIntervalsStartTimesList):
      # Convert minArrivalNumbers and arrIntervalsStartTimesList
      # into a list of cars arriving every 15 minutes: numCarsList[96]
      numCarsList = [ ]
      for index in range(len(minNumArrivals)):
          ncars = np.uint(np.round(np.random.uniform(
              minNumArrivals[index], maxNumArrivals[index])))
          numCarsList.append(ncars)
#================================================================================
#     # !!!!!!!!!!!!!!!!!!!!!!!!!!!!!!!!!!!!!!!!!!!!!!!!
#     # The following list is a fixed artificial list for testing.
#     # Delete the following line when testing has ben done.
#     numCarsList = [0, 0, 0, 0, 0, 0, 0, 0, 0, 0, 0, 0, 0, 0, 0, 0, 0, 0, 0, \
#                    0, 0, 0, 0, 0, 0, 0, 0, 0, 0, 0, 0, 0, 2, 3, 5, 4, 1, 0, \
#                    3, 2, 1, 0, 0, 0, 0, 0, 2, 0, 0, 0, 0, 0, 0, 0, 0, 0, 0, \
#                    0, 0, 0, 0, 0, 0, 0, 0, 0, 0, 0, 0, 0, 0, 0, 0, 0, 0, 0, \
#                    0, 0, 0, 0, 0, 0, 0, 0, 0, 0, 0, 0, 0, 0, 0, 0, 0, 0, 0,]

#================================================================================

#================================================================================
#     nCars = sum(numCarsList)
#     print 'nCars = ', nCars

#================================================================================
      # Create arrivalTimesList: a list of times when cars arrive
      arrivalTimesList = [ ]
      while len(numCarsList)>0:
          arrivalsThisInterval = np.random.uniform(arrIntervalsStartTimesList[0], \
                         arrIntervalsStartTimesList[1], numCarsList[0])
```

TABLE 1-continued

Code for Charging Simulation

```
            if len(arrivalsThisInterval)>0:
                arrivalTimesList = arrivalTimesList + arrivalsThisInterval.tolist( )
            arrIntervalsStartTimesList.pop(0)
            numCarsList.pop(0)
        arrivalTimesList.sort( )

================================================================================
==
#   # !!!!!!!!!!!!!!!!!!!!!!!!!!!!!!!!!!!!!!!!!!!!!!!
#   # The following list is a fixed artificial list for testing.
#   # Delete the following line when testing has been done.
#   arrivalTimesList = [10.5, 11.5, 13.5, 20., 1049.98, 1060.]

================================================================================
==
        return arrivalTimesList
# fed calculateArrivalTimes( )
def calculateChargingTimes(nCars, arrModelsList, batCapList, chargerUsed, \
                           charger_powers, arrSOClist, desDepSOClist):
        """ For every car, calculate how much time it will take to charge. """
        print '- Inside calculateChargingTimes( ) ---'
        print 'arrModelsList = ', arrModelsList
        print 'batCapList = ', batCapList
        print 'chargerUsed = ', chargerUsed
        print 'charger_powers = ', charger_powers
        #print 'arrSOClist = ', arrSOClist
        print 'desDepSOClist = ', desDepSOClist
        desiredChargingTimesList = [ ]
        for car in range(nCars):

================================================================================
==
#           print '---'
#           print '(desDepSOClist[car] - arrSOClist[car]) = ', \
#               desDepSOClist[car] - arrSOClist[car]
#           print 'arrModelsList[car] = ', \
#               arrModelsList[car]
#           print 'batCapList[arrModelsList[car]] = ', \
#               batCapList[arrModelsList[car]-1]
#           print 'charger_powers[chargerUsed] = ', \
#               charger_powers[chargerUsed]

================================================================================
==
            # Mark the 1 subtracted from arrModelsList[car]
            x_charge_needed = (desDepSOClist[car] - arrSOClist[car]) * \
                batCapList[arrModelsList[car]-1]/100.
            time = x_charge_needed * 60./ charger_powers[chargerUsed]
            #print 'time = ', time
            desiredChargingTimesList.append(time)
        return desiredChargingTimesList
#fed calculateChargingTimes( )
def calculateInterchangeIntervals(nCars, interchangeParams):
        """ Calculate interchange time """
        #interchangeParams = [inter_allowed, inter_min, inter_max]
        inter_allowed = interchangeParams[0]
        inter_min   = interchangeParams[1]
        inter_max   = interchangeParams[2]
        print 'inter_allowed = ',inter_allowed
        print 'inter_min = ',inter_min
        print 'inter_max = ',inter_max
        # Find mean and sigma
        mu    = 0.5 * (inter_max + inter_min)
        sigma = 0.25 * (inter_max - inter_min)
        interchangeIntervalsList = [ ]
        for index in range(nCars):
            interchangeTime = 0.
            if inter_allowed == 'Yes' or inter_allowed == 'yes':
                interchangeTime = random.gauss(mu, sigma)
                if interchangeTime < 0.:
                    interchangeTime = 0.
            # fi
            interchangeIntervalsList.append(interchangeTime)
        # rof
        # print 'interchangeIntervalsList = ', interchangeIntervalsList
        return interchangeIntervalsList
# fed calculateInterchangeIntervals
def setupResultsArray(nCars, modelsList, Model_batCaps, arrivalTimesList, \
```

TABLE 1-continued

Code for Charging Simulation

```
                arrSOClist, desDepSOClist, desiredChargingTimesList, \
                interchangeIntervalsList):
    """ Define resultsArray and fill in partially with data so far available. """
    # Create an array to hold results. One row per car
    rArray = np.zeros((nCars, nCols))
    # Populate some of the rArray
    for ndex in range(nCars):
        rArray[ndex,C_car]            = ndex+1         # Vehicle id
        rArray[ndex,C_model]          = modelsList[ndex]
        rArray[ndex,C_arrival_time]   = arrivalTimesList[ndex]
        rArray[ndex,C_arrSOC]         = arrSOClist[ndex]
        rArray[ndex,C_desDepSOC]      = desDepSOClist[ndex]
        rArray[ndex,C_actualDepSOC]   = desDepSOClist[ndex] # Temporarily
        rArray[ndex,C_charging_interval] = desiredChargingTimesList[ndex]
        rArray[ndex,C_interchange_interval] = interchangeIntervalsList[ndex]
        rArray[ndex,C_batCap]         = Model_batCaps[modelsList[ndex]]
        # The following entries tells us that we do not yet know
        # how long a customer waited , or if a customer were impatient
        rArray[ndex,C_wait_interval]  = -1
        rArray[ndex,C_wasCustImpatient] = -1
    # rof
    # Columns not filled in: waitingTime, charger, startTime, ChrgrEndTime,
    #   ChrgrEndTime, Charging Interval, InterchangeTime, RolloverInterval,
    #   RolloverTime.
    return rArray
#fed setupResultsArray( )
def pickCharger(charger_nos, charger_powers, charger_startTimes, \
                charger_stopTimes):
    """ Only one kind of charger is so far supported. """
    if level2debug
        print 'charger_nos, charger_powers, charger_startTimes, \
                charger_stopTimes = ', charger_nos, charger_powers, charger_startTimes, \
                charger_stopTimes
    for index in range(len(charger_nos)):
        if charger_nos[index]>0:
            nChargers     = charger_nos[index]
            chargersPower = charger_powers[index]
            # Times below being converted from hours to minutes
            # Minutes are canonical
            chargersStartTime = 60. * charger_startTimes[index]
            chargersStopTime  = 60. * charger_stopTimes[index]
            break
        # fi
    # rof
    if level2debug:
        print 'nChargers, chargersPower, chargersStartTime, chargersStopTime = ', \
                nChargers, chargersPower, chargersStartTime, chargersStopTime
    return nChargers, chargersPower, chargersStartTime, chargersStopTime
# fed pickCharger( )
def newTrafficGenerator(env, resultsArray, charger, chargersStartTime, \
                        chargersPower, impatienceParams):
    """ This is the new traffic generator. """
    if level2debug:
        print '--- Inside the new traffic generator.'
    nrows = np.shape(resultsArray)[0]
    if level2debug:
        print 'nrows =', nrows
    # Wait till chargerStrtTime
    yield env.timeout(chargersStartTime)
    previousArrivalTime = chargersStartTime
    for index in range(nrows):
        arrivalTime = resultsArray[index,C_arrival_time]
        if arrivalTime < chargersStartTime:
            yieldForPeriod = 0
        else:
            if level2debug:
                print ' - nextPass ---'
            yieldForPeriod = arrivalTime - previousArrivalTime
            if level2debug:
                print ' yieldForPeriod = ', yieldForPeriod
            previousArrivalTime = arrivalTime
        # print 'yieldForPeriod = ', yieldForPeriod
        yield env.timeout(yieldForPeriod)
        # Place the customer in the service queue
        customerNumber = index
        c = customer(env, customerNumber, charger, resultsArray, \
                     chargersPower, impatienceParams)
        env.process(c)
```

TABLE 1-continued

Code for Charging Simulation

```
        # rof
        return
# fed newTrafficGenerator( )
def chargerAssignment(results, nChargers):
    """ Determines the binding of a specific car to a specific charger. """
    if level2debug:
        print '$$$$$$$$$$$$$$$$$$$$$$$$$$$$$$$$$$$$$$$$$$$$$$$$$$$$'
        print ' Entering charger assignment code. '
        print 'results = '
        print results
    # The queue of available chargers
    freeQ = range(nChargers, 0, -1)
    if level2debug:
        print 'freeQ = ', freeQ
    # Empty lists defined
    startList = [ ]
    endList   = [ ]
    married   = [ ]
    for index, row in enumerate (results):
        car       = results[index, C_car]           # get the car id
        startTime = results[index, C_charging_start_time] # get charging start time
        endTime   = results[index, C_rollover_end_time]
        # A car needs be associated with a charger
        #!!!!!!!!!!!!!!!!!!!!!!!!!!!!!!!!!!!!!!!!!
        # Is the if condition below needed?
        if startTime != 0.:
            startList.append([startTime, 's', car])   # s for associate
        # A car needs be dissociated from the charger it was associated with
        if results[index, 5] != 0.:
            endList.append([endTime, 'd', car])       # d for dissociate
    #startList = [[0.0, 's', 1.0]] + startList       # [time, a/d, car]
    # Put both the lists together
    eventsList = startList + endList
#================================================================
#   print '****************************************'
#   print 'endList = '   , endList
#   print 'eventsList = ' , eventsList
#   print '--------------------------------------'

#================================================================
    # Sort endTime in increasing order of time
    # startTime list needs no sorting. Already in order
    endList.sort( )
    # Sort the combined (start and end) events list
    eventsList = sorted(eventsList, key = lambda x:(x[0],x[1]))
    if level2debug:
        print 'eventsList = ' , eventsList

#================================================================
#   print 'endList = ' , endList
#   print '\neventsList = '   , eventsList
#   print '****************************************'

#================================================================
    for sublist in eventsList:
        if level2debug:
            print 'sublist = ', sublist
            print 'married = ', married
        car = sublist[2]
        if level2debug:
            print 'car = ', car
        resultsIndex = int(car) - 1

#================================================================
#       print 'results = '
print results

#================================================================
        # Associate a charger
        if sublist[1]=='s':
            if level2debug:
```

TABLE 1-continued

Code for Charging Simulation

```
                print '--- inside if'
                print 'freeQ = ', freeQ
            charger = freeQ.pop( )
            if level2debug:
                print 'charger = ', charger
            results[resultsIndex, C_charger] = charger
            if level2debug:
                print 'results[', resultsIndex, ', C_charger] = ', charger
            married.append([car, charger])
            if level2debug:
                print 'married = ', married
    # Dissociate a charger
    else: # sublist[1]=='d'
        if level2debug:
            print '--- inside else'
        for index, sublist in enumerate(married):
            if level2debug:
                print 'index = ', index
            if car == sublist[0]:
                if level2debug:
                    print 'inside if, sublist = ', sublist
                charger = sublist[1]
                if level2debug:
                    print 'charger = ', charger
                freeQ = freeQ + [charger]
                freeQ.sort( )
                if level2debug:
                    print 'freeQ = ', freeQ
                del married[index]
                if level2debug:
                    print 'married = ', married
        # fi
    # rof
    return results
# fed chargerAssignment
def printResultsToCSV (resArray, nChargers, chargersStopTime, chargersPower, \
                      Model_batCaps):
    """ Prints out the results in a table """
    if level2debug:
        print '- Inside printResultsToCSV---'
    # Fill in the 'Charger' column
    resArray = chargerAssignment(resArray, nChargers)
    # Create an empty list
    EVReport = [ ]
    if level2debug:
        print '- Inside printResultsToCSV ---'
    # The header row
    EVReport.append(['Car', 'ArrTime', 'ArrHour', 'ArrMinutes', \
                     'WaitInterval', 'Charger', \
                     'StartTime', 'EndTime', 'ChargeInterval', \
                     'InterchangeInterval', 'RolloverInterval', \
                     'RolloverTime', 'Model', 'Arrival SOC', \
                     'Desired Dep SOC', 'Actual Dep SOC', 'Was Impatient'])

#=============================================================================
==
# C_car                  = 0
# C_arrival_time         = 1
# C_wait_interval        = 2
C_charger              = 3
C_charging_start_time  = 4
C_charging_end_time    = 5
C_charging_interval    = 6
C_interchange_interval = 7
C_rollover_interval    = 8
C_rollover_end_time    = 9
C_model                = 10
C_batCap               = 11
C_arrSOC               = 12
C_desDepSOC            = 13
C_actualDepSOC         = 14
C_wasCustImpatient     = 15

#=============================================================================
==
    # For now, zero out wait intervals and interchange intervals
    totalWaitIntervals    = 0.
    totalInterchangeIntervals = 0.
```

TABLE 1-continued

Code for Charging Simulation

```
        # Set up counts for how many rows will be accounted for
        # when averages are calculated
        waitIntervalsDivisor      = len(resArray)
        interchangeIntervalsDivisor = len(resArray)
        # Make a list of zeros, nChargers long
        chargerUse = [0]*nChargers
        if level2debug:
            print 'chargerUse = ', chargerUse
        # Run through the rows of resArray. Milk for data
        nImpatient    = 0
        nCarsServed   = 0
        nCarsNotServed = 0
        nPartiallyCharged = 0
        totWaitingTimeForServed = 0.
        totalInterchangeTime   = 0.
        minWaitingTime     = 1500.
        maxWaitingTime     = 0.
        minInterTime      = 1500.
        maxInterTime      = -1.
        # Fill in one of results array columns
        for index, row in enumerate(resArray):
            resArray[index, C_car_only_partially_charged] = 0
        for index, row in enumerate(resArray):
#===============================================================================
#          # Find actualDepSOC
#          xarrSOC   = resArray[index,C_arrSOC]
#          xbatCap   = Model_batCaps[np.int(resArray[index,C_model])-1]
#          xbeginCharge = (xarrSOC * xbatCap)/100.
#          xChInterval = resArray[index,C_charging_interval]
#          xNewCharge  = xChInterval * chargersPower/60.
#          xTotalCharge = xbeginCharge + xNewCharge
#          xNewSOC    = (xTotalCharge * 100.)/ xbatCap
#          print 'xarrSOC, xbatCap, xbeginCharge, xChInterval, xNewCharge, \
#              xTotalCharge, xNewSOC = ', xarrSOC, xbatCap, xbeginCharge, xChInterval,
xNewCharge, \
#              xTotalCharge, xNewSOC

#===============================================================================
            # Calculate the state of charge at departure
            carModel    = resArray[index,C_model]
            # Battery capacity below in kWh.
            # Note: 1 is subtracted because models are
            batteryCapacity = Model_batCaps[np.int(carModel) - 1]
            chargeOnArrival = resArray[index,C_arrSOC]*batteryCapacity/100.
            depSOC = (resArray[index,C_arrSOC] * \
                    Model_batCaps[np.int(resArray[index,C_model])-1] + \
                    (resArray[index,C_charging_end_time] - \
                     resArray[index,C_charging_start_time]) * chargers Power) /
Model_batCaps[np.int(resArray[index,C_model])-1]
            #print 'depSOC = ', depSOC

#===============================================================================
# C_car             = 0
C_arrival_time    = 1
# C_wait_interval   = 2
# C_charger         = 3
# C_charging_start_time = 4
# C_charging_end_time   = 5 modify
# C_charging_interval   = 6 modify
# C_interchange_interval = 7 modify
# C_rollover_interval    = 8 modify
# C_rollover_end_time    = 9 modify
# C_model           = 10
# C_batCap          = 11
# C_arrSOC          = 12
# C_desDepSOC       = 13
# C_actualDepSOC    = 14 modify
# C_wasCustImpatient = 15

#===============================================================================
            Car     = np.uint8(resArray[index, C_car])
            ArrTime = resArray[index, C_arrival_time]
            Wait    = resArray[index, C_wait_interval]
```

TABLE 1-continued

Code for Charging Simulation

```
        #print 'Wait = resArray[index, C_wait_interval] = ', Wait
        Charger     = resArray[index, C_charger]
        ChStartTime = resArray[index, C_charging_start_time]
        ChEndTime   = resArray[index, C_charging_end_time]
        Model       = resArray[index, C_model]
        ArrSOC      = resArray[index, C_arrSOC]
        DesDepSOC   = resArray[index, C_desDepSOC]
        ActDepSOC   = resArray[index, C_actualDepSOC]
        impatience  = resArray[index, C_wasCustImpatient]
        # *** Fix up waiting times column
        # If an EV arrived after charger end time, its wait is 0
        if ArrTime > chargersStopTime:
            Wait = 0.
            resArray[index, C_wait_interval] = Wait
        # For those that have not been assigned waiting times so far:
        elif Wait < 0:
            Wait = chargersStopTime - ArrTime
            resArray[index, C_wait_interval] = Wait
        # Add Wait value to totalWaitIntervals
        totalWaitIntervals += Wait

#==============================================================================
#       # *** Fix charging end time
#       # Correct if charging end time > chargersStopTime
#       if ChEndTime > chargersStopTime:
#           # Correct the charging end time
#           resArray[index, C_charging_end_time] = chargersStopTime
#           # Zap the interchange interval value
#           resArray[index, C_interchange_interval] = 0.
#           interchangeIntervalsDivisor -= 1
#           #Update the rollover end time
resArray[index, C_rollover_end_time] = chargersStopTime

#==============================================================================
        # Read the new ChEndTime
        ChEndTime = resArray[index, C_charging_end_time]
        # Find the new charging interval
        chargingHappeningTime = ChEndTime - ChStartTime
        # Fill in the new charging interval time
        resArray[index, C_charging_interval] = chargingHappeningTime
        # *** Fix the Interchange time
        ChInterchangeInterval = resArray[index, C_interchange_interval]
        if ArrTime >= chargersStopTime:
            waitIntervalsDivisor -= 1
            interchangeIntervalsDivisor -= 1
            ChInterchangeInterval = 0.
            ChRolloverInt = 0.
            ChRolloverEnd = chargersStopTime
            # Write in all the stuff above
            resArray[index, C_interchange_interval] = ChInterchangeInterval
            #Update the rollover end time
            resArray[index, C_rollover_end_time] = chargersStopTime
        # Write in the C_rollover_interval
        ChRolloverInt = chargingHappeningTime + ChInterchangeInterval
        resArray[index, C_rollover_interval] = ChRolloverInt
        # Fix actDepSOC for cars whose charging stops prematurely
        if ChEndTime > chargersStopTime:
            batteryCapacity  = Model_batCaps[np.int(resArray[index,C_model])-1]
            arrivingCharge   = ArrSOC * batteryCapacity / 100.
            print 'ArrSOC, batteryCapacity, arrivingCharge = ', \
                ArrSOC, batteryCapacity, arrivingCharge
            charging_interval = chargersStopTime - ChStartTime
            chargeTransferred = charging_interval * chargersPower/60.
            depCharge = arrivingCharge + chargeTransferred
            print 'charging_interval, chargeTransferred, depCharge = ', \
                charging_interval, chargeTransferred, depCharge
            ActDepSOC = depCharge * 100. / batteryCapacity
            resArray[index, C_charging_end_time] = chargersStopTime
            resArray[index, C_actualDepSOC] = ActDepSOC
            resArray[index, C_interchange_interval] = 0.
            resArray[index, C_rollover_interval] = 0.
            resArray[index, C_rollover_end_time] = 0.
            nPartiallyCharged += 1
            interchangeIntervalsDivisor -= 1
            resArray[index, C_car_only_partially_charged] = 1
        # Fix actDepSOC for cars arriving after chargersStopTime
```

TABLE 1-continued

| Code for Charging Simulation |
| --- |

```
elif ArrTime >= chargersStopTime:
    ActDepSOC = ArrSOC
    resArray[index, C__actualDepSOC] = ArrSOC
    resArrayfindex, C__rollover__end__time] = 0.
else: # Update C__rollover__end__time for all others
    resArray[index, C__rollover__end__time] = \
        resArray[index, C__charging__start__time] + \
        resArrayfindex, C__charging__interval]   + \
        resArrayfindex, C__interchange__interval]
# How much is each charger used
chargerUse[np.int(Charger)-1] += resArray[index, C__charging__interval]
# Update totalInterchangeIntervals
totalInterchangeIntervals += ChInterchangeInterval
# Was the customer impatient?
if impatience == 1 :
    nImpatient += 1
    wasImpatient = 'Yes'
    resArray[index, C__actualDepSOC] = ArrSOC
else:
    wasImpatient = 'No'
# For those for whom no charger was assigned
if resArray[index, C__charger] == 0:
    resArray[index, C__interchange__interval] = 0.
    resArray[index, C__rollover__interval] = 0.
    resArray[index, C__rollover__end__time] = 0.
    resArray[index, C__actualDepSOC] = resArray[index, C__arrSOC]
    nCarsNotServed += 1
# Read all the data agains from resArray
Car      = np.uint8(resArray[index, C__car])
ArrTime  = resArray[index, C__arrival__time]
Wait     = resArray[index, C__wait__interval]
#print 'Wait = resArray[index, C__wait__interval] = ', Wait
Charger     = resArray[index, C__charger]
ChStartTime = resArray[index, C__charging__start__time]
ChEndTime   = resArray[index, C__charging__end__time]
ChInterchangeInterval = resArray[index, C__interchange__interval]
ChRolloverInt = resArray[index, C__rollover__interval]
ChRolloverEnd = resArray[index, C__rollover__end__time]
Model    = resArray[index, C__model]
ArrSOC      = resArray[index, C__arrSOC]
DesDepSOC   = resArray[index, C__desDepSOC]
ActDepSOC   = resArray[index, C__actualDepSOC]
impatience  = resArray[index, C__wasCustImpatient]
charging__interval = ChEndTime - ChStartTime
ArrHour  = np.floor(ArrTime) // 60
ArrMinutes = ArrTime - ArrHour * 60.
EVReport.append([Car, "%.2f" % ArrTime, "%2d" % ArrHour, \
                "%.2f" % ArrMinutes, \
                "%.2f" % Wait, Charger, \
                "%.2f" % ChStartTime, "%.2f" % ChEndTime, \
                "%.2f" % charging__interval, \
                "%.2f" % ChInterchangeInterval, \
                "%.2f" % ChRolloverInt, \
                "%.2f" % ChRolloverEnd, 'Model '+str(np.int(Model)), \
                "%.2f" % ArrSOC, "%.2f" % DesDepSOC, \
                "%.2f" % ActDepSOC, wasImpatient])
# For those cars that were served
if resArray[index, C__charging__interval] > 0.:
    waitingTime = resArray[index, C__wait__interval]
    totWaitingTimeForServed += waitingTime
    #totalInterchangeTime += resArray[index, C__interchange__interval]
    if waitingTime < minWaitingTime: minWaitingTime = waitingTime
    if waitingTime > maxWaitingTime: maxWaitingTime = waitingTime
    # Furthermore if car were not only partially charged
    if resArray[index, C__car__only__partially__charged] == 0:
        interTime = resArray[index, C__interchange__interval]
        totalInterchangeTime += interTime
        if interTime < minInterTime:
            minInterTime = interTime
        if interTime > maxInterTime:
            maxInterTime = interTime
```

TABLE 1-continued

Code for Charging Simulation

```
        # rof
        nCars = np.shape(resArray)[0]
        nCarsServed = nCars - nCarsNotServed
        n Interchanges = nCarsServed - nPartiallyCharged
#===============================================================================
#    # Report sattistics
#    averageWait = totalWaitIntervals/waitIntervalsDivisor
#    averageInterchange = totalInterchangeIntervals/interchangeIntervalsDivisor
#    if level2debug:
#         print 'averageWait, averageInterchange = ', averageWait, averageInterchange
#    EVReport.append([ ])
#    EVReport.append(['ave Wait', 'ave Inter'])
#    EVReport.append(["%.2f" % averageWait, "%.2f" % averageInterchange])

#===============================================================================
        # Charger usage
        EVReport.append([ ])
        EVReport.append(['Charger', 'Usage'])
        for index in range(nChargers):
            EVReport.append([index+1 , "%.2f" % chargerUse[index]])
        # Numbers of vehicles served / not served
        EVReport.append([ ])
        EVReport.append(['# Cars', '# Charged', '# Not charged', '# Impatient'])
        EVReport.append(["%4d" % nCars, "%4d" % nCarsServed, \
                         "%4d" % nCarsNotServed, "%4d" % nImpatient])
        # Waiting times summary
        EVReport.append([ ])
        EVReport.append(['Total waiting time for cars served', \
                         'Min waiting time for cars served', \
                         'Max waiting time for cars served', \
                         'Mean waiting time for cars served'])
        if nCarsServed == 0:
            EVReport.append(["%.2f" % totWaitingTimeForServed, \
                             "%.2f" % minWaitingTime, "%.2f" % maxWaitingTime, \
                             "No cars served"])
        else:
            EVReport.append(["%.2f" % totWaitingTimeForServed, \
                             "%.2f" % minWaitingTime, "%.2f" % maxWaitingTime, \
                             "%.2f" % (totWaitingTimeForServed/nCarsServed)])
        # Intrchanges summary
        EVReport.append([ ])
        EVReport.append(['Number of interchanges', 'Total interchange time', \
                         'Min interchange time', 'Max interchange time', \
                         'Mean interchange time'])
        if nInterchanges==0:
            EVReport.append([0,0,'No interchanges', 'No interchanges', \
                             'No interchanges'])
        else:
            EVReport.append(["%4d" % nInterchanges, "%.2f" % totalInterchangeTime, \
                             "%.2f" % minInterTime, "%.2f" % maxInterTime, \
                             "%.2f" % (totalInterchangeTime/nInterchanges)])

#===============================================================================
#    print 'EVReport = '
#    print EVReport

#===============================================================================
        with open(resultsFile, 'wb') as csvfile:
            writer = csv.writer(csvfile, delimiter',',
                              quotechar='|', quoting=csv.QUOTE_MINIMAL)
            for index, row in enumerate(EVReport):
                writer.writerow(EVReport[index])
        return
def customer(env, custNum, charger, resultsArray, chargersPower, \
             impatienceParams):
    """"Car arrives, is served and leaves.""""
    #global freeq
    arrive = resultsArray[custNum,C_arrival_time]
    if level2debug:
        debugPrintResults(resultsArray)
    with charger.request( ) as req:
        if level2debug:
            print 'charger = ', charger.count
```

TABLE 1-continued

Code for Charging Simulation

```
            # Account for patience and impatience
            patience = 2400.  # Just any old large value
            if impatienceParams[0] == 'Yes' or impatienceParams[0] == 'yes':
                proportionImpatient = impatienceParams[1]/100.
                probability = random.uniform(0., 1.)
                if probability > proportionImpatient:
                    patience = 2400.
                else:
                    minPatience = impatienceParams[2]
                    maxPatience = impatienceParams[3]
                    patience = random.uniform(minPatience, maxPatience)
            # Wait for the charger. Or abort if impatient
            results = yield req | env.timeout(patience)
            wait = env.now − arrive

=================================================================================
# C__car               = 0
# C__arrival_time      = 1
# C__wait_interval     = 2
# C__charger           = 3
# C__charging_start_time = 4
# C__charging_end_time   = 5
# C__charging_interval   = 6
# C__interchange_interval = 7
# C__rollover_interval = 8
# C__rollover_end_time = 9
# C__model             = 10
# C__batCap            = 11
# C__arrSOC            = 12
# C__desDepSOC         = 13
# C__actualDepSOC      = 14
# C__wasCustImpatient  = 15

=================================================================================
            if req in results:
                # We got to the charger
                if level2debug:
                    print('%7.2f Car%s, charger%s, service started' % (env.now, \
                        custNum, charger.count))
                # Charging begins at this time
                resultsArray[custNum, C__charging_start_time] = env.now
                if level2debug:
                    print('%7.2f Car%s waited for %6.3f' % (env.now, custNum, wait))
                resultsArray[custNum, C__wait_interval] = wait
                # Read charging time
                tCharger = resultsArray[custNum, C__charging_interval]

=================================================================================
#           chargeNeeded = resultsArray[custNum,C__desDepSOC] − \
#               resultsArray[custNum,C__arrSOC]
#           tCharger = 60. * chargeNeeded/chargersPower
#           print 'In customer( ): Charging time = ', tCharger
#           resultsArray[custNum, C__charging_interval] = tCharger

=================================================================================
                # Time when charging will end
                resultsArray[custNum, C__charging_end_time] = env.now + tCharger
                # Work in the interchange delay
                tInter = resultsArray[custNum, C__interchange_interval]
                tCharger += tInter
                yield env.timeout(tCharger)
                if level2debug:
                    print('%7.2f Car%s, service ended' % (env.now, custNum))
                resultsArray[custNum, C__wasCustImpatient] = 0
                resultsArrayfcustNum, C__rollover_end_time] = env.now
            else:
                # Customer reneged
                if level2debug:
                    print('%7.2f Car%s RENEGED after %6.3f' % (env.now, custNum, wait))
                resultsArray[custNum, C__wasCustImpatient]    = 1
                resultsArray[custNum, C__wait_interval]       = wait
                resultsArray[custNum, C__interchange_interval] = 0.
```

TABLE 1-continued

Code for Charging Simulation

```
            resultsArray[custNum, C_rollover_interval]   = 0.
            resultsArray[custNum, C_actualDepSOC]        = \
                resultsArray[custNum, C_arrSOC]

===============================================================================
#    print 'Last line in customer( ), resultsArray = ',
#    print resultsArray

===============================================================================
# fed customer( )
def main( ):
    """ Simulate the arrrival of evs at an office complex.
    Simulate charging facilities that serve them.
    Print out statistics. """
    print '### Start EV Charging Simulation #######################'
    # Read user data
    # Only one kind of charger is present
    #!!!!!!!!!!!!!!!!!!!!!!!!!!!!!!!!!!!! Assumption
    arrIntervalsStartTimesList, minNumArrivals, maxNumArrivals, \
        Model_probs, Model_batCaps, Model_minArrSOC, Model_maxArrSOC, \
        Model_minDepSOC, charger_nos, charger_powers, charger_startTimes, \
        charger_stopTimes, interchangeParams, impatienceParams, \
        chargerUsed = readUserData( )
    print 'Model_batCaps = ', Model_batCaps
    # Generate the list of times of arrival for all EVs
    arrivalTimesList = calculateArrivalTimes(minNumArrivals, maxNumArrivals, \
                                arrIntervalsStartTimesList)

===============================================================================
#    arrivalTimesList = [18.46,25.86,361.,367.48,390.93,400.28,422.05,426.03,\
#                       949.33,1132.68,1179.92,1183.86,1275.76,1289.15]

===============================================================================
    # The total number of cars
    nCars = len(arrivalTimesList)
    # Generate modelsList, arrSOClist, depSOClist
    modelsList, arrSOClist, desDepSOClist = \
        evData(nCars, Model_probs, Model_minArrSOC, Model_maxArrSOC, \
               Model_minDepSOC)

===============================================================================
#    arrSOClist = [52.73,37.48,31.41,41.42,18.58,10.96,38.92,10.62,39.16,\
#                  23.93,14.67,28.86,26.26,25.51]

===============================================================================
    # Calculate charging times
    desiredChargingTimesList = calculateChargingTimes(nCars, modelsList, \
                                    Model_batCaps, \
                                    chargerUsed, charger_powers, arrSOClist, \
                                    desDepSOClist)
    # print 'desiredChargingTimesList = ', desiredChargingTimesList
    # Calculate interchange interval
    interchangeIntervalsList = calculateInterchangeIntervals(nCars, \
                                    interchangeParams)
    #print 'interchangeIntervalsList = ', interchangeIntervalsList

===============================================================================
#    interchangeIntervalsList=[6.96,6.85,7.08,10.13,7.02,1.88,8.75,6.5,6.69,\
#                              0 ,0  ,0  ,0,   0]

===============================================================================
    # Set up resultsArray
    resultsArray = setupResultsArray(nCars, modelsList, Model_batCaps, \
                        arrivalTimesList, \
                        arrSOClist, desDepSOClist, desiredChargingTimesList, \
                        interchangeIntervalsList)
    # Columns of resultsArray not so far filled in: waitingTime, charger, \
    #    startTime, ChrgrEndTime, ChrgrEndTime, ChargingInterval, \
    #    InterchangeTime, RolloverInterval, RolloverTime, and ActualDepSOC.
    # Set up simpy environment
```

TABLE 1-continued

Code for Charging Simulation

```
        random.seed(randomSeed)
        env = simpy.Environment( )
        # Pick charger
        # Start and stop time entries were in hours in the user inputs sheet
        # pickCharger converts them into minutes. Minutes are canonical
        nChargers, chargersPower, chargersStartTime, chargersStopTime = \
            pickCharger(charger_nos, charger_powers, charger_startTimes, \
                            charger_stopTimes)
#   print 'nChargers, chargersPower, chargersStartTime, chargersStopTime = ',\
#       nChargers, chargersPower, chargersStartTime, chargersStopTime
        # Start processes and run
        charger = simpy.Resource(env, capacity=nChargers)
#=================================================================
==
#   env.process(trafficGenerator(env, arrivalTimesList, arrivalPoissonMean, \
#                          charger, resultsArray))

#=================================================================
==
        env.process(newTrafficGenerator(env, resultsArray, charger, \
                                        chargersStartTime, chargers Power, \
                                        impatienceParams))

#=================================================================
==
#   # If service is not confined to office hours
#   if not constrainedTime:
#       env.run(until = 1440)
#   # Else if service is confined to office hours
#   else:
#       env.run(until=chargersStopTime)

#=================================================================
==
        env.run(until=chargersStopTime)
        #$$$$$$$$$$$$$
        debugPrintResults(resultsArray)
        printResultsToCSV (resultsArray, nChargers, chargersStopTime, \
                            chargers Power, Model_batCaps)
# fed main( )
if __name__ == "__main__":
    main( )
```

TABLE 2

Code for EV Charging Station Planning

```
# -*- coding: utf-8 -*-
"""
"""
import scipy.io
import numpy as np
import pandas as pd
#import matplotlib.pyplot as plt
#import EV_chargingstation_planning_functions as ECPfun
# define parameters of the planing model
# time interval (in a day)
t_number_inaday = 96;
delta_time = 24.0/t_number_inaday;
# rated charging power and charging efficiency
P_rated = 6.6 #kw
P_effi = 0.92
# penalty for unsatisfied charging demands, in $/kWh
Cost_penalty = 1 # in $, which is approximately 5 times of the electricity price
Cost_interchange = 2/(24*delta_time*P_rated) #in $/kWh,
# Let T denote the average idle time (in hour) of all the EVs, then, assume to interchange one EV
cost 2 $
# Then, the costs here is 2/(T*P_rated), in this paper, T is 6 hour, P_rated is 6.6
# actually, it is pretty hard to define how to evaluate interchange.
# In reality, interchange number is not directly relevant to amount of vehicle parking time
# here, we are actually adopting average values.
# costs for chargers in US Dollars
Cost_charger = 500.0
Interest = 0.05
```

TABLE 2-continued

Code for EV Charging Station Planning

```
Lifetime = 15
Capital_recover_factor = Interest*(1+Interest)**Lifetime/((1+Interest)**Lifetime−1)
# costs for energy storage system
Cost_ES_P = 400 # in $/kW
Cost_ES_E = 600 # in $/kWh
# for chance-constrained formulation, this is the chance eplison, the constraints
# will be satisfied by probability 1−eplison
Chance_probability=0.2;
# Transformer capacity
Transformer_cap=800# kVA
# define time of use electricity prices
TOU = np.zeros(t_number_inaday) # this should be time of use
# time of use prices can be different for commercial/residential/
np.put(TOU, np.arange(0,34), 0.217)
np.put(TOU, np.arange(34,48), 0.244)
np.put(TOU, np.arange(48,72), 0.268)
np.put(TOU, np.arange(72,86), 0.244)
np.put(TOU, np.arange(86,96), 0.217)
# demand charge prices $/kW at peak hours. only charge for each month
Demand_charge_price = 28 # may be also time of use.
# interchange parameters
Interchange_time_mean = 1
Interchange_change_variance =0.1
# load all the uncertain data from the csv file
df=pd.read_csv('Data_Uncertain_par.csv', header=None)
P_ub_aggregate=np.asarray(df.set_index(0).T.to_dict('list')["P_ub_aggregate"])
P_ub_aggregate_sigma=np.asarray(df.set_index(0).T.to_dict('list')["P_ub_aggregate_sigma"])
P_lb_aggregate=np.asarray(df.set_index(0).T.to_dict('list')["P_lb_aggregate"])
P_lb_aggregate_sigma=np.asarray(df.set_index(0).T.to_dict('list')["P_lb_aggregate_sigma"])
E_ub_aggregate=np.asarray(df.set_index(0).T.to_dict('list')["E_ub_aggregate"])
E_ub_aggregate_sigma=np.asarray(df.set_index(0).T.to_dict('list')["E_ub_aggregate_sigma"])
E_lb_aggregate=np.asarray(df.set_index(0).T.to_dict('list')["E_lb_aggregate"])
E_lb_aggregate_sigma=np.asarray(df.set_index(0).T.to_dict('list')["E_lb_aggregate_sigma"])
P_ub_aggregate_bf=np.asarray(df.set_index(0).T.to_dict('list')["P_ub_aggregate_bf"])
P_ub_aggregate_bf_sigma=np.asarray(df.set_index(0).T.to_dict('list')["P_ub_aggregate_bf_sigma"
])
P_lb_aggregate_bf=np.asarray(df.set_index(0).T.to_dict('list')["P_ib_aggregate_bf"])
P_lb_aggregate_bf_sigma=np.asarray(df.set_index(0).T.to_dict('list')["P_lb_aggregate_bf_sigma"])
E_ub_aggregate_bf=np.asarray(df.set_index(0).T.to_dict('list')["E_ub_aggregate_bf"])
E_ub_aggregate_bf_sigma=np.asarray(df.set_index(0).T.to_dict('list')["E_ub_aggregate_bf_sigma"
])
E_lb_aggregate_bf=np.asarray(df.set_index(0).T.to_dict('list')["E_lb_aggregate_bf"])
E_lb_aggregate_bf_sigma=np.asarray(df.set_index(0).T.to_dict('list')["E_lb_aggregate_bf_sigma"])
# PV generation Profile
PV_capacity = 600
PV_profile=np.asarray(df.set_index(0).T.to_dict('list')["PV_profile"])
PV_profile_sigma=np.asarray(df.set_index(0).T.to_dict('list')["PV_profile_sigma"])
# Based Load profile
BaseLoad_profile=np.asarray(df.set_index(0).T.to_dict('list')["BaseLoad_profile"])
BaseLoad_profile_sigma=np.asarray(df.set_index(0).T.to_dict('list')["BaseLoad_profile_sigma"])
# Net Load Profile
Net_Load_profile=np.asarray(df.set_index(0).T.to_dict('list')["Net_Load_profile"])
Net_Load_profile_sigma=np.asarray(df.set_index(0).T.to_dict('list')["Net_Load_profile_sigma"])
# print(Baseload_profile)
#plt.rc('text', usetex=True)
plt.rc('font', family='serif')
#plt.figure(figsize=(10,6))
Plot trade-off curve.
#plt.subplot(111)
#plt.plot(np.arange(t_number_inaday*2)*delta_time, np.hstack((TOU,TOU)), label="TOU")
#plt.xlabel(r'time(hour)', fontsize=16)
#plt.ylabel(r'\$/kWh', fontsize=16)
#plt.xticks(np.arange(0,49,4))
#plt.title('Time of Use Electricity Price', fontsize=16)
#plt.show( )
                              EV_chargingstation_planning_functions.py
#!/usr/bin/env python2
# -*- coding: utf-8 -*-
"""
Created on Wed May 9 10:44:12 2018
@author: Hongcai Zhang @ UC Berkeley
This file defines the functions that will be used in our planning problem
"""
import scipy.io
import numpy as np
import matplotlib.pyplot as plt
import matplotlib
pgf_with_rc_fonts = {"pgf.texsystem": "pdflatex"}
```

TABLE 2-continued

Code for EV Charging Station Planning

```
matplotlib.rcParams.update(pgf_with_rc_fonts)
import EV_chargingstation_planning_inputdata_I2 as ECPinput
# functions for preprocessing EV charging demand data
def EV_charging_demand_read( ):
    # read data from the .mat file generated by matlab
    data= scipy.io.loadmat('EV_charging_demands_NHTS_simulation.mat')
    EV_demand_temp = data['EV_charge_demand']
    j = 0
    for i in range(0,len(EV_demand_temp[:,0])):
        if EV_demand_temp[i, 7] == 31 : # 31 is an idenfication code for workplace charging
            EV_demand_temp[i,6] = 0.95
            if j==0:
                EV_demand=np.matrix([EV_demand_temp[i,0:7]])
            else:
                EV_demand = np.vstack([EV_demand, EV_demand_temp[i,0:7]])
            j+=1
    # the EV_demand data include: index, arrive time, departure time, battery_capacity,
    # arrive soc, rated charging power, required soc level (0.95)
    # The rated charging power is a paramter in our planning model, hence it is not used
    return EV_demand
# function to sample the demands from the data set
def EV_charging_demand_sample(EV_demand, EV_number):
    EV_demand_sample=[ ]
    EV_num_total = len(EV_demand[:,0])
    for i in range(0,EV_number):
        EV_index = int(EV_num_total*np.random.random_sample( ))
        if i == 0:
            EV_demand_sample = EV_demand[EV_index, :]
        else:
            EV_demand_sample = np.vstack([EV_demand_sample, EV_demand[EV_index, :]])
    return EV_demand_sample
# function to add a buffer to each charging demand which represents the time reqruied for
interchange
def EV_charging_demand_buffer(EV_demand):
    P_rated=ECPinput.P_rated
    P_effi=ECPinput.P_effi
    delta_time=ECPinput.delta_time
    Interchange_time_mean=ECPinput.Interchange_time_mean
    Interchange_change_variance=ECPinput.Interchange_change_variance
    EV_demand_buffer = [ ]
    for EV_demand_temp in EV_demand:
        # decrease the SoC of the charging demands to add the buffer
        EV_demand_temp[0,4]-=np.random.normal(Interchange_time_mean,
Interchange_change_variance)*delta_time*P_rated*P_effi/EV_demand_temp[0,3]
        if np.size(EV_demand_buffer) == 0:
            EV_demand_buffer = EV_demand_temp
        else:
            EV_demand_buffer = np.vstack([EV_demand_buffer, EV_demand_temp])
    return EV_demand_buffer
# functions for calculating power and energy boundaries
# the input of this function include the raw EV demand data, i.e., EV_demamnd, number of
demand to be generated,
# number of time intervals, t_number, delta_t.
def EV_aggregate_model(EV_demand):
#     global P_rated
#     global P_effi
#     global daytickpoints
#     global delta_time
#     t_number = daytickpoints
    P_rated=ECPinput.P_rated
    P_effi=ECPinput.P_effi
    t_number=ECPinput.t_number_inaday
    delta_time=ECPinput.delta_time
    EV_number = len(EV_demand[:,0])
    # the following code is used to add some uncertainty
#     EV_number_actual = EV_number*(1 + 0.2*(np.random.random_sample( )-0.5))
    P_max = np.zeros(t_number*2)
    P_min = np.zeros(t_number*2)
    E_max = np.zeros(t_number*2)
    E_min = np.zeros(t_number*2)
    for EV_index in range(0,EV_number):
        P_max_individual = np.zeros(t_number*2)
        P_min_individual = np.zeros(t_number*2)
        E_max_individual = np.zeros(t_number*2)
        E_min_individual = np.zeros(t_number*2)
        arrive_time = int(EV_demand[EV_index, 1])
```

TABLE 2-continued

Code for EV Charging Station Planning

```
            if EV_demand[EV_index, 2] < arrive_time:
                departure_time = int(t_number + EV_demand[EV_index, 2])
            else:
                departure_time = int(EV_demand[EV_index, 2])
            battery_capacity = EV_demand[EV_index, 3]
            arrive_soc = EV_demand[EV_index, 4]
            leave_soc = EV_demand[EV_index, 6]
            max_soc = 1
            if leave_soc > arrive_soc + (departure_time-
    arrive_time)*P_rated*P_effi*delta_time/battery_capacity :
                leave_soc = arrive_soc + (departure_time-
    arrive_time)*P_rated*P_effi*delta_time/battery_capacity-0.05
            # calculate P_min_individual
            # for V1G scenario, P_min_individual is just zero
            # calculate p_max_individual
            np.put(P_max_individual, arrive_time-1 + np.arange(departure_time-arrive_time+1), P_rated)
            # calculate E_max_individual
            e_max = (max_soc-arrive_soc)*battery_capacity
            e_charge_asfastaspossible = np.zeros(t_number*2)
            np.put(e_charge_asfastaspossible, departure_time-1 + np.arange(t_number*2-
    departure_time+1), e_max)
            np.put(e_charge_asfastaspossible, arrive_time-1 + np.arange(departure_time-arrive_time+1),
    P_rated*P_effi*delta_time*(1+np.arange(departure_time-arrive_time+1)))
            E_max_individual = np.minimum(e_charge_asfastaspossible, e_max*np.ones(t_number*2))
    #       print E_max_individual
            # calculate E_min_individual
            if leave_soc > arrive_soc:
                e_min = (leave_soc-arrive_soc)*battery_capacity
                e_charge_asslowaspossible = np.zeros(t_number*2)
                t_require = int((leave_soc-arrive_soc)*battery_capacity/(P_rated*P_effi*delta_time))
                np.put(e_charge_asslowaspossible, departure_time-t_require + np.arange(t_require),
    P_rated*P_effi*delta_time*(1+np.arange(t_require)))
                np.put(e_charge_asslowaspossible, departure_time-1 + np.arange(t_number*2-
    departure_time+1), e_max)
                E_min_individual = np.minimum(e_charge_asslowaspossible, e_min)
            P_max += P_max_individual
            P_min += P_min_individual
            E_max += E_max_individual
            E_min += E_min_individual
        return P_max, P_min, E_max, E_min
    def EV_aggregate_model_bf(EV_demand):
        P_rated=ECPinput.P_rated
        P_effi=ECPinput.P_effi
        t_number=ECPinput.t_number_inaday
        delta_time=ECPinput.delta_time
        EV_number = len(EV_demand[:,0])
        # the following code is used to add some uncertainty
    #   EV_number_actual = EV_number*(1 + 0.2*(np.random.random_sample( )-0.5))
        P_max = np.zeros(t_number*2)
        P_min = np.zeros(t_number*2)
        E_max = np.zeros(t_number*2)
        E_min = np.zeros(t_number*2)
        for EV_Index in range(0,EV_number):
            P_max_individual = np.zeros(t_number*2)
            P_min_individual = np.zeros(t_number*2)
            E_max_individual = np.zeros(t_number*2)
            E_min_individual = np.zeros(t_number*2)
            arrive_time = int(EV_demand[EV_index, 1])
            if EV_demand[EV_index, 2] < arrive_time:
                departure_time = int(t_number + EV_demand[EV_index, 2])
            else:
                departure_time = int(EV_demand[EV_index, 2])
            battery_capacity = EV_demand[EV_index, 3]
            arrive_soc = EV_demand[EV_index, 4]
            leave_soc = EV_demand[EV_index, 6]
            max_soc = 1
            if leave_soc > arrive_soc + (departure_time-
    arrive_time)*P_rated*P_effi*delta_time/battery_capacity :
                leave_soc = arrive_soc + (departure_time-
    arrive_time)*P_rated*P_effi*delta_time/battery_capacity-0.05
            # calculate P_min_individual
            # for V1G scenario, P_min_individual is just zero
            # calculate p_max_individual
            np.put(P_max_individual, arrive_time-1 + np.arange(departure_time-arrive_time+1), P_rated)
            # calculate E_max_individual
            for temp_t in range(0, t_number*2):
                np.put(E_max_individual, temp_t,
```

TABLE 2-continued

Code for EV Charging Station Planning

```
            P_effi*delta_time*np.sum(P_max_individual[0:temp_t+1]))
        e_max = (max_soc-arrive_soc)*battery_capacity
        # calculate E_min_individual
        if leave_soc > arrive_soc:
            e_min = (leave_soc-arrive_soc)*battery_capacity
            e_charge_asslowaspossible = np.zeros(t_number*2)
            t_require = int((leave_soc-arrive_soc)*battery_capacity/(P_rated*P_effi*delta_time))
            np.put(e_charge_asslowaspossible, departure_time-t_require + np.arange(t_require),
P_rated*P_effi*delta_time*(1+np.arange(t_require)))
            np.put(e_charge_asslowaspossible, departure_time-1 + np.arange(t_number*2-
departure_time+1), e_max)
            E_min_individual = np.minimum(e_charge_asslowaspossible, e_min)
        P_max += P_max_individual
        P_min += P_min_individual
        E_max += E_max_individual
        E_min += E_min_individual
    return P_max, P_min, E_max, E_min
# function for plotting the optimizaiton results, energy and power boundaries etc
def EV_plot_result(P_ub_aggregate, P_lb_aggregate, E_ub_aggregate, E_lb_aggregate,
P_optimal=None, E_optimal=None):
    # plot results
    delta_time=0.25
    plt.rc('text', usetex=True)
    plt.rc('font', family='serif')
    plt.figure(figsize=(20,6))
    # Plot trade-off curve.
    plt.subplot(121)
    plt.plot(np.arange(len(P_ub_aggregate))*delta_time, P_ub_aggregate, label="P_max")
    plt.plot(np.arange(len(P_lb_aggregate))*delta_time, P_lb_aggregate, label="P_min")
    if P_optimal is not None:
        plt.plot(np.arange(len(P_ub_aggregate))*delta_time, P_optimal, label="P_ev")
        plt.legend(['Pmax','Pmin','Poptimal'], fontsize=16)
    else:
        plt.legend(['Pmax','Pmin'], fontsize=16)
    plt.xlabel(r'Time (hour)', fontsize=16)
    plt.ylabel(r'kW', fontsize=16)
    plt.xticks(np.arange(0,49,4))
    plt.title('Power boundaries', fontsize=16)
    # Plot entries of x vs. gamma.
    plt.subplot(122)
    plt.plot(np.arange(len(E_ub_aggregate))*delta_time, E_ub_aggregate, label="E_max")
    plt.plot(np.arange(len(E_lb_aggregate))*delta_time, E_lb_aggregate, label="E_min")
    if E_optimal is not None:
        plt.plot(np.arange(len(E_lb_aggregate))*delta_time, E_optimal, label="E_optimal")
        plt.legend(['Emax','Emin','Eoptimal'], fontsize=16)
    else:
        plt.legend(['Emax','Emin'], fontsize=16)
    plt.xlabel(r'Time (hour)', fontsize=16)
    plt.ylabel(r'kWh', fontsize=16)
    plt.xticks(np.arange(0,49,4))
    plt.title('Energy boundaries', fontsize=16)
    plt.show( )
def EV_plot_result_2(Power_timeindex, Power_profile, Power_legend, Energy_timeindex,
Energy_profile, Energy_legend):
    # plot results
    plt.rc('text', usetex=True)
    plt.rc("font", size = 28, family = "Times New Roman")
    plt.figure(figsize=(20,6))
    # Plot trade-off curve.
    plt.subplot(121)
    for temp_power in Power_profile:
        plt.plot(Power_timeindex, temp_power)
    plt.legend(Power_legend, fontsize=28)
    plt.xlabel(r'Time (hour)', fontsize=28)
    plt.ylabel(r'kW', fontsize=28)
    plt.xticks(np.arange(0,49,4))
    plt.title('Power', fontsize=28)
    # Plot entries of x vs. gamma.
    plt.subplot(122)
    for temp_energy in Energy_profile:
        plt.plot(Energy_timeindex, temp_energy)
    plt.legend(Energy_legend, fontsize=28)
    plt.xlabel(r'Time (hour)', fontsize=28)
    plt.ylabel(r'kWh', fontsize=28)
```

TABLE 2-continued

Code for EV Charging Station Planning

```
        plt.xticks(np.arange(0,49,4))
        plt.title('Energy', fontsize=28)
        plt.show( )
                                EV_chargingstation_planning_stage2.py
#!/usr/bin/env python2
# -*- coding: utf-8 -*-
""" """
Created on Wed May 16 22:39:04 2018
@author: Hongcai Zhang @ UC Berkeley
""" """
import cvxpy as cvx
import numpy as np
import gurobipy
import cplex
import EV_chargingstation_planning_functions as ECPfun
import EV_chargingstation_planning_inputdata as ECPinput
from scipy.stats import norm
def ECP_stage2_coordinated_interchangewithdelay(P_ub_aggregate, P_lb_aggreagate,
E_ub_aggregate, \
                                E_lb_aggregate, E_ub_aggregate_bf, E_lb_aggregate_bf,
                                BaseLoad_profile=None, PV_profile=None, \
                                Cost_interchange=None, Cost_charger=None,\
                                Cost_ES_P=None, Cost_ES_E=None,\
                                plotfig=None):
    # coordinated charging scenario, without interchange
    # First, we may add a buffer to each vehicle's required charging duration to represent their
interchange time
    # Then, the invested number of chargers should at least satisfy the demands with the
interchange buffer
    # However, the difference between the parking profile and the actual charging profile will be
penalized accounting to
    # the interchange costs. In my mind, the interchange costs should be relevant to the total space
being removed
    if BaseLoad_profile.any( ) == None:
        BaseLoad_profile = ECPinput.BaseLoad_profile
    if PV_profile.any( ) == None:
        PV_profile = ECPinput.PV_profile
    if Cost_interchange== None:
        Cost_interchange = ECPinput.Cost_interchange
    if Cost_charger== None:
        Cost_charger = ECPinput.Cost_charger
    if Cost_ES_P== None:
        Cost_ES_P = ECPinput.Cost_ES_P
    if Cost_ES_E== None:
        Cost_ES_E = ECPinput.Cost_ES_E
    # Creat decision variables
    x = cvx.Variable(integer=True) # number of chargers
    y = cvx.Variable(1) # energy capacity of ES
    z = cvx.Variable(1) # power capacity of ES
    P_EV = cvx.Variable(ECPinput.t_number_inaday*2)
    P_EV_loss = cvx.Variable(ECPinput.t_number_inaday*2) # unsatisfied demand
    P_EV_bf = cvx.Variable(ECPinput.t_number_inaday*2) # charging power with interchange buffer
    P_EV_bf_interchanged = cvx.Variable(ECPinput.t_number_inaday*2) # the demand that is
interchanged
    P_grid_net = cvx.Variable(ECPinput.t_number_inaday*2) # net grid load
    P_ES_charge = cvx.Variable(ECPinput.t_number_inaday*2)
    P_ES_discharge = cvx.Variable(ECPinput.t_number_inaday*2)
    E_ES_initial = cvx.Variable(1) # initial state of energy
    P_grid_net_max = cvx.Variable(1) # peak demand of net load
    # Constraints
    # constraints, domain & aggregate power , the power of the EVs should not violate the amount
that EVs can actually accept
        constraints = [x >= 0, P_EV >= P_lb_aggregate, P_EV <= P_ub_aggregate, P_EV_loss >=0,
P_EV_bf >=0, \
                        P_EV_bf_interchanged >=0, P_EV <= P_EV_bf]
    # Storage constraints
    # power
        constraints_storage = [P_ES_charge>=0, P_ES_discharge>=0, P_ES_charge<= z,
P_ES_discharge<= z, E_ES_initiai>=0]
    # energy
    for temp_t in range(0, ECPinput.t_number_inaday*2):
        constraints_storage += [E_ES_initial +
ECPinput.delta_time*cvx.sum(ECPinput.P_effi*P_ES_charge[0:temp_t+1] \
P_ES_discharge[0:temp_t+1/ECPinput.P_effi) >= 0]
        constraints_storage += [E_ES_initial +
```

TABLE 2-continued

Code for EV Charging Station Planning

```
ECPinput.delta_time*cvx.sum(ECPinput.P_effi*P_ES_charge[0:temp_t+1] \
P_ES_discharge[0:temp_t+1/ECPinput.P_effi) >= y]
    # energy equilibrium
    constraints_storage += [ECPinput.delta_time*cvx.sum(ECPinput.P_effi*P_ES_charge –
P_ES_discharge/ECPinput.P_effi) == 0]
    # coupled constraints
    constraints_coupled = [P_EV + P_ES_charge + BaseLoad_profile == P_grid_net +
P_ES_discharge + PV_profile];
    constraints_coupled += [P_grid_net <= ECPinput.Transformer_cap, P_grid_net >= -
ECPinput.Transformer_cap]
    # peak demand
    constraints_coupled += [P_grid_net<= P_grid_net_max]
    # constraints for EVs
    # interchange relationship
    constraints += [P_EV_bf_interchanged+P_EV_bf == P_ub_aggregate]
    # constraints, Aggregate energy, the commulative energy consumption should satisfy the
demands
    for temp_t in range(0, ECPinput.t_number_inaday*2):
        constraints += [ECPinput.P_effi*ECPinput.delta_time*cvx.sum(P_EV_bf[0:temp_t+1]) >=
E_lb_aggregate_bf[temp_t]]
        constraints += [ECPinput.P_effi*ECPinput.delta_time*cvx.sum(P_EV[0:temp_t+1]) <=
E_ub_aggregate[temp_t]]
        constraints += [ECPinput.P_effi*ECPinput.delta_time*cvx.sum(P_EV[0:temp_t+1]) >=
E_lb_aggregate[temp_t]]
    # constraints, charger number, the EV charging power should not violate the capacity that
chargers can actually provide
    constraints += [P_EV_bf[0:ECPinput.t_number_inaday] + P_EV_bf[ECPinput.t_number_inaday:]
<= ECPinput.P_rated*x]
    # objective, investment costs + operation costs (electricity costs)
    # objective, investment costs + operation costs (electricity costs)
    Costs_investment = ECPinput.Capital_recover_factor*(Cost_charger*x + Cost_ES_E*y +
Cost_ES_P*z) # capital investment
    Costs_electricity =
365*ECPinput.delta_time*cvx.sum(np.hstack((ECPinput.TOU,ECPinput.TOU))*P_grid_net) #
electricity costs
    Costs_electricity_demandcharge = 12*ECPinput.Demand_charge_price*P_grid_net_max #
electricity costs
    Costs_interchange =
365*ECPinput.delta_time*Cost_interchange*cvx.sum(P_EV_bf_interchanged) # interchange labor
costs
    Costs_penalty = 365*ECPinput.delta_time*ECPinput.Cost_penalty*cvx.sum(P_EV_loss)
#penalty for EV loss
    Costs_penalty_smooth = 365*0.0001*cvx.sum(P_grid_net) #penalty for EV loss
    obj =
cvx.Minimize(Costs_investment+Costs_electricity+Costs_electricity_demandcharge+Costs_interch
ange+Costs_penalty+Costs_penalty_smooth)
    # solve problem.
    prob = cvx.Problem(obj, constraints+constraints_storage+constraints_coupled)
    # solve the problem, here we adopted the solver gurobi
    result = prob.solve(solver="GUROBI", verbose=False)
    # Optimizaiton output
    print "Coordinated charging with interchange & delay:", prob.status
    print "optimal value", prob.value
    print "Number of charger value:", x.value
    print "Energy capacity of ES:", y.value
    print "Power capacity of ES:", z.value
    print "Investment costs:", Costs_investment.value
    print "Electricity costs:", Costs_electricity.value
    print "Electricity costs (demand charge):", Costs_electricity_demandcharge.value
    print "Interchange costs:", Costs_interchange.value
    print "Penalty costs:", Costs_penalty.value
    # plot results
    E_optimal=np.zeros(96*2)
    E_optimal_bf=np.zeros(96*2)
    for temp_t in range(0, 96*2):
        np.put(E_optimal, temp_t, ECPinput.P_effi*0.25*np.sum(P_EV.value[0:temp_t+1]))
        np.put(E_optimal_bf, temp_t, ECPinput.P_effi*0.25*np.sum(P_EV_bf.value[0:temp_t+1]))
    if plotfig is not None:
        # plot results
        ECPfun.EV_plot_result_2(np.arange(len(P_ub_aggregate))*ECPinput.delta_time, \
                    [P_ub_aggregate, P_lb_aggregate, P_EV.value, P_EV_bf.value], \
                    ['Pmax','Pmin','P\_EV', 'P\_EV\_bf'], \
                    np.arange(len(P_ub_aggregate))*ECPinput.delta_time, \
                    [E_ub_aggregate, E_lb_aggregate, E_ub_aggregate_bf, E_lb_aggregate_bf,
```

TABLE 2-continued

Code for EV Charging Station Planning

```
                             E_optimal], \
                                           ['Emax','Emin','Emaxbf','Eminbf', 'E_optimal'])
      return x.value, y.value, z.value, P_EV.value, P_EV_loss.value, P_EV_bf.value,
P_EV_bf_interchanged.value, \
                 P_grid_net.value, P_ES_charge.value, P_ES_discharge.value,E_ES_initial.value, \
                 Costs_investment.value, Costs_electricity.value, Costs_electricity_demandcharge.value,
Costs_interchange.value, \
                 Costs_penalty.value
def ECP_stage2_coordinated_interchangewithdelay_stochastic(P_ub_aggregate,
P_ub_aggregate_sigma, \
                                           P_lb_aggregate, P_lb_aggregate_sigma,\
                                           E_ub_aggregate, E_ub_aggregate_sigma, \
                                           E_lb_aggregate, E_lb_aggregate_sigma,\
                                           P_ub_aggregate_bf, P_ub_aggregate_bf_sigma, \
                                           P_lb_aggregate_bf, P_lb_aggregate_bf_sigma,\
                                           E_ub_aggregate_bf, E_ub_aggregate_bf_sigma, \
                                           E_lb_aggregate_bf, E_lb_aggregate_bf_sigma,\
                                           BaseLoad_profile=None, BaseLoad_profile_sigma=None, \
                                           PV_profile=None, PV_profile_sigma=None, \
                                           Net_load_profile=None, Net_load_profile_sigma=None, \
                                           Cost_interchange=None, Cost_charger=None,\
                                           Cost_ES_P=None, Cost_ES_E=None,\
                                           Chance_probability=None, plotfig=None):
      # coordinated charging scenario, without interchange
      # First, we may add a buffer to each vehicle's required charging duration to represent their
interchange time
      # Then, the invested number of chargers should at least satisfy the demands with the
interchange buffer
      # However, the difference between the parking profile and the actual charging profile will be
penalized accounting to
      # the interchange costs. In my mind, the interchange costs should be relevant to the total space
being removed
      if BaseLoad_profile.any( ) == None:
           BaseLoad_profile = ECPinput.BaseLoad_profile
           BaseLoad_profile_sigma = ECPinput.BaseLoad_profile_sigma
      if PV_profile.any( ) == None:
           PV_profile = ECPinput.PV_profile
           PV_profile_sigma = ECPinput.PV_profile_sigma
      if Net_load_profile.any( ) == None:
           Net_load_profile = ECPinput.Net_load_profile
           Net_load_profile_sigma = ECPinput.Net_load_profile_sigma
      if Cost_interchange== None:
           Cost_interchange = ECPinput.Cost_interchange
      if Cost_charger== None:
           Cost_charger = ECPinput.Cost_charger
      if Cost_ES_P== None:
           Cost_ES_P = ECPinput.Cost_ES_P
      if Cost_ES_E== None:
           Cost_ES_E = ECPinput.Cost_ES_E
      if Chance_probability== None:
           Chance_probability = ECPinput.Chance_probability
      # Phi^-1 (chance_probability)
      Chance_pr_inverse_ub = norm.ppf(Chance_probability, loc=0, scale=1);
      Chance_pr_inverse_lb = norm.ppf(1−Chance_probability, loc=0, scale=1);
      # Creat decision variables
      x = cvx.Variable(integer=True) # number of chargers
      y = cvx.Variable(1) # energy capacity of ES
      z = cvx.Variable(1) # power capacity of ES
      P_EV = cvx.Variable(ECPinput.t_number_inaday*2)
      P_EV_loss = cvx.Variable(ECPinput.t_number_inaday*2) # unsatisfied demand
      # P_EV_bf = cvx.Variable(ECPinput.t_number_inaday*2) # charging power with interchange
buffer
      P_EV_bf_interchanged = cvx.Variable(ECPinput.t_number_inaday*2) # the demand that is
interchanged
      P_grid_net = cvx.Variable(ECPinput.t_number_inaday*2) # net grid load
      P_ES_charge = cvx.Variable(ECPinput.t_number_inaday*2)
      P_ES_discharge = cvx.Variable(ECPinput.t_number_inaday*2)
      E_ES_initial = cvx.Variable(1) # initial state of energy
      P_grid_net_max = cvx.Variable(1) # peak demand of net load
      # Constraints s
      # constraints, domain & aggregate power , the power of the EVs should not violate the amount
that EVs can actually accept
           constraints = [x >= 0, P_EV >= P_lb_aggregate, P_EV + P_EV_loss <= np.clip(P_ub_aggregate
+ Chance_pr_inverse_ub*P_ub_aggregate_sigma,0.1,10**10), P_EV_loss >=0, \
                             P_EV_bf_interchanged >=0]
      # Storage constraints
      # power
           constraints_storage = [P_ES_charge>=0, P_ES_discharge>=0, P_ES_charge<= z,
```

TABLE 2-continued

Code for EV Charging Station Planning

```
P_ES_discharge<= z, E_ES_initial>=0]
    # energy
    for temp_t in range(0, ECPinput.t_number_inaday*2):
        constraints_storage += [E_ES_initial +
ECPinput.delta_time*cvx.sum(ECPinput.P_effi*P_ES_charge[0:temp_t+1] \
P_ES_discharge[0:temp_t+1]/ECPinput.P_effi) >= 0]
        constraints_storage += [E_ES_initial +
ECPinput.delta_time*cvx.sum(ECPinput.P_effi*P_ES_charge[0:temp_t+1] \
P_ES_discharge[0:temp_t+1]/ECPinput.P_effi) <= y]
    # energy equilibrium
    constraints_storage += [ECPinput.delta_time*cvx.sum(ECPinput.P_effi*P_ES_charge -
P_ES_discharge/ECPinput.P_effi) == 0]
    # coupled constraints, i kept the constraint to calculate the netgrid (mean value)
    constraints_coupled = [P_EV + P_ES_charge + Net_load_profile == P_grid_net +
P_ES_discharge ];
    # upper bound
    constraints_coupled += [-ECPinput.Transformer_cap -(P_EV + P_ES_charge-P_ES_discharge)
<= Net_load_profile + Chance_pr_inverse_ub*Net_load_profile_sigma];
    # lower bound
    constraints_coupled += [ ECPinput.Transformer_cap -(P_EV + P_ES_charge-P_ES_discharge)
>= Net_load_profile + Chance_pr_inverse_lb*Net_load_profile_sigma];
    # peak demand, for this peak demand, it may be hard to describe. May be I can learn from the
history that
    # the peak demand happends at the D% percentile? so that I can just adopt a fixed value for
that. Here, I simply adopted the value in the chance-constraint
#   constraints_coupled += [P_grid_net<= P_grid_net_max]
    constraints_coupled += [P_grid_net_max - (P_EV + P_ES_charge-P_ES_discharge) >=
Net_load_profile + Chance_pr_inverse_lb*Net_load_profile_sigma]
    # constraints for EVs
    # interchange relationship
    constraints += [P_EV_bf_interchanged <= np.clip(P_ub_aggregate_bf +
Chance_pr_inverse_ub*P_ub_aggregate_bf_sigma,0.1,10**10), P_EV+P_EV_bf_interchanged <=
np.clip(P_ub_aggregate_bf + Chance_pr_inverse_ub*P_ub_aggregate_bf_sigma,0.1,10**10)]
    # constraints, Aggregate energy, the commulative energy consumption should satisfy the
demands
    temp_P_ub_max = np.clip(P_ub_aggregate +
Chance_pr_inverse_ub*P_ub_aggregate_sigma,0.1,10**10)
    for temp_t in range(0, ECPinput.t_number_inaday*2):
        constraints +=
[ECPinput.P_effi*ECPinput.delta_time*cvx.sum(P_ub_aggregate_bf[0:temp_t+1] -
P_EV_bf_interchanged[0:temp_t+1]) >= E_lb_aggregate_bf[temp_t] +
Chance_pr_inverse_lb*E_lb_aggregate_bf_sigma[temp_t]]
        # infact, the upper bound on the energy constraints is not necessary
#       constraints +=
[ECPinput.P_effi*ECPinput.delta_time*cvx.sum_entries(P_EV[0:temp_t+1]+P_EV_loss[0:temp_t+1
]) <= E_ub_aggregate[temp_t] + Chance_pr_inverse_ub*E_ub_aggregate_sigma[temp_t]]
        constraints +=
[ECPinput.P_effi*ECPinput.delta_time*cvx.sum(P_EV[0:temp_t+1]+P_EV_loss[0:temp_t+1]) >=
np.clip(E_lb_aggregate[temp_t] +
Chance_pr_inverse_lb*E_lb_aggregate_sigma[temp_t],0,ECPinput.P_effi*ECPinput.delta_time*np.
sum(temp_P_ub_max[0:temp_t+1]))]
    # constraints, charger number, the EV charging power should not violate the capacity that
chargers can actually provide
    constraints += [P_ub_aggregate_bf[0:ECPinput.t_number_inaday] +
P_ub_aggregate_bf[ECPinput.t_number_inaday:] +
Chance_pr_inverse_lb*(P_ub_aggregate_bf_sigma[0:ECPinput.t_number_inaday] +
P_ub_aggregate_bf_sigma[ECPinput.t_number_inaday:]) <=
P_EV_bf_interchanged[0:ECPinput.t_number_inaday] +
P_EV_bf_interchanged[ECPinput.t_number_inaday:] + ECPinput.P_rated*x]
    # objective, investment costs + operation costs (electricity costs)
    # objective, investment costs + operation costs (electricity costs)
    Costs_investment = ECPinput.Capital_recover_factor*(Cost_charger*x + Cost_ES_E*y +
Cost_ES_P*z) # capital investment
    Costs_electricity =
0.0*365*ECPinput.delta_time*cvx.sum(np.hstack((ECPinput.TOU,ECPinput.TOU))*P_grid_net) #
electricity costs
    Costs_electricity_demandcharge = 12*ECPinput.Demand_charge_price*P_grid_net_max #
electricity costs
    Costs_interchange =
365*ECPinput.delta_time*Cost_interchange*cvx.sum(P_EV_bf_interchanged) # interchange labor
costs
    Costs_penalty = 365*ECPinput.delta_time*ECPinput.Cost_penalty*cvx.sum(P_EV_loss)
#penalty for EV loss
    Costs_penalty_smooth = 365*0.0001*cvx.sum(P_grid_net) #penalty to smooth EV charging
demands, may be not necessary
    obj =
cvx.Minimize(Costs_investment+Costs_electricity+Costs_electricity_demandcharge+Costs_interch
ange+Costs_penalty+Costs_penalty_smooth)
```

TABLE 2-continued

Code for EV Charging Station Planning

```
    # solve problem.
    prob = cvx.Problem(obj, constraints+constraints_storage+constraints_coupled)
    # solve the problem, here we adopted the solver gurobi
#   result = prob.solve(solver="GUROBI", verbose=True)
    result = prob.solve(solver="CPLEX", verbose=True)
    # Optimizaiton output
    print "Coordinated charging with interchange & delay:", prob.status
    print "optimal value", prob.value
    print "Number of charger value:", x.value
    print "Energy capacity of ES:", y.value
    print "Power capacity of ES:", z.value
    print "Investment costs:", Costs_investment.value
    print "Electricity costs:", Costs_electricity.value
    print "Electricity costs (demand charge):", Costs_electricity_demandcharge.value
    print "Interchange costs:", Costs_interchange.value
    print "Penalty costs:", Costs_penalty.value
    P_EV_bf = P_ub_aggregate_bf - P_EV_bf_interchanged
    # plot results
    E_optimal=np.zeros(96*2)
    E_optimal_bf=np.zeros(96*2)
    for temp in range(0, 96*2):
        np.put(E_optimal, temp_t, ECPinput.P_effi*0.25*np.sum(P_EV.value[0:temp_t+1]))
        np.put(E_optimal_bf, temp_t, ECPinput.P_effi*0.25*np.sum(P_EV_bf.value[0:temp_t+1]))
    if plotfig == 1 :
        # plot results
        ECPfun.EV_plot_result_2(np.arange(len(P_ub_aggregate))*ECPinput.delta_time, \
                    [P_ub_aggregate, P_lb_aggregate, P_EV.value, P_EV_bf.value], \
                    ['Pmax','Pmin','P\_EV', 'P\_EV\_bf'],
                    np.arange(len(P_ub_aggregate))*ECPinput.delta_time, \
                    [E_ub_aggregate, E_lb_aggregate, E_ub_aggregate_bf, E_lb_aggregate_bf,
E_optimal], \
                    ['Emax','Emin','Emaxbf','Eminbf', 'E\_optimal'])
    return x.value, y.value, z.value, P_EV.value, P_EV_loss.value, P_EV_bf.value,
P_EV_bf_interchanged.value, \
            P_grid_net.value, P_ES_charge.value, P_ES_discharge.value,E_ES_initial.value, \
            Costs_investment.value, Costs_electricity.value, Costs_electricity_demandcharge.value,
Costs_interchange.value, \
            Costs_penalty.value
```

What is claimed is:

1. An apparatus for configuration and control of Electric Vehicle (EV) charging infrastructure, the apparatus comprising:
   (a) a processor; and
   (b) a non-transitory memory storing instructions executable by the processor;
   (c) wherein said instructions, when executed by the processor, perform steps comprising:
      (i) receiving user input data associated with one or more parameters of an EV charging infrastructure;
      (ii) storing inputs as system data for various aspects of the EV charging infrastructure configuration;
      (iii) submitting the system data to an optimal planning module; which is configured for performing optimization based on objectives in view of a set of constraints; and
      (iv) generating a recommendation from the optimal planning module for the custom EV charging infrastructure based on one or more factors comprising: charging needs, behavior of EV end users, interchange time and cost, instances of impatience, waiting time, and penalty for unfulfillment both at an aggregated demand level and at an individual vehicle level;
      (v) validating the recommendation from the optimal planning module using a discrete event-based simulator to assess the extent of queuing characteristics present in the EV charging infrastructure configuration and if needed adjust the recommendation from the optimal planning module to minimize issues determined from the simulator; and
      (vi) generating one or more charging schedules via a controlling module for custom EV charging based on one or more input parameters,
   wherein said charging schedules are generated from the controlling module based on short term forecasting, rolling unit commitment, optimal dispatch and error correction for generating a custom EV charging profile;
   and
   wherein the custom EV charging profile is generated based on one or more input parameters are selected from the group comprising: weather conditions, EV charging needs, EV queue management strategy, cost of energy, pricing strategy, and behavior of EV end users to minimizing operating cost of the EV charging infrastructure.

2. The apparatus of claim 1, wherein the queuing characteristics are selected from the group comprising: waiting time, queue length, impact of interchange or transition times, and instances of impatience.

3. The apparatus of claim 1, wherein the one or more input parameters are selected from the group comprising: EV facility infrastructure, EV facility preferences, EV mobility behavior and preferences, EV end user preferences, EV data, distributed energy resource (DER) specifications, utility and market data, weather data, master data, financial data, business model data.

4. The apparatus of claim 1, wherein said instructions when executed by the processor are configured to generate the recommendation by generating solutions in response to mathematical models, machine learning, and convex optimization to determine optimal component sizes and control set-points within the EV charging infrastructure.

5. The apparatus of claim 1, wherein said instructions when executed by the processor are configured to generate the recommendation by utilizing objective functions to support a selected objective optimization goal with respect to the EV charging infrastructure.

6. The apparatus of claim 5, wherein said objective function comprises a deterministic algorithm in which uncertainty in any input parameters is not considered when modeling the system.

7. The apparatus of claim 5, wherein said objective function comprises a stochastic algorithm that accounts for uncertainty in at least a portion of the input parameters.

8. The apparatus of claim 1, wherein said instructions when executed by the processor are configured to generate the recommendation for the EV charging infrastructure via generating outputs selected from the group of outputs comprising: financial data output, technical operations data output, and business model data output.

9. The apparatus of claim 8, wherein said financial output is selected from the group of financial data outputs comprising: investment decisions, type, number and size of EV chargers in the EV charging infrastructure, investment for EV charging infrastructure upgrades, annualized investment cost of the EV charging infrastructure, and operating costs of the EV charging infrastructure.

10. The apparatus of claim 8, wherein said technical operations data output is selected from the group of technical operations data outputs comprising: per unit time load profile for EV facility load with contribution from residential load and each EV charger load, charger utilization, queue length, queue waiting time and space usage statistics as a function of unit time for an individual EV being charged, and fulfilled and unfulfilled charging requirements.

11. The apparatus of claim 8, wherein said business model data output is selected from the group of business model data outputs comprising: suggested pricing schemes, financial analysis of the EV charging infrastructure, cash flow with respect to the EV charging infrastructure, and net present value of the EV charging infrastructure.

12. The apparatus of claim 1, wherein the one or more input parameters are selected from the group comprising: battery capacity, state of charge upon arrival or departure, facility operating hours, queue management strategy, queue length, waiting time, and transition time.

13. The apparatus of claim 1, wherein the optimal planning module comprises a pre-processing module that processes the one or more input parameters and outputs an aggregated or individual EV charging demand profile for input by an optimization module.

14. The apparatus of claim 13, wherein the EV charging demand profile is adjusted for statistical variance.

15. The apparatus of claim 13, wherein the pre-processing module further generates one or more facility profiles.

16. A method for configuration and control of an Electric Vehicle (EV) charging infrastructure, the method comprising:
  receiving user input data associated with one or more parameters of an EV charging infrastructure;
  storing inputs as system data for various aspects of the EV charging infrastructure configuration;
  submitting the system data to an optimal planning module; which is configured for performing optimization based on objectives in view of a set of constraints; and
  generating a recommendation from the optimal planning module for the custom EV charging infrastructure based on one or more factors comprising: charging needs, behavior of EV end users, interchange time and cost, instances of impatience, waiting time, and penalty for unfulfillment both at an aggregated demand level and at an individual vehicle level;
  validating the recommendation from the optimal planning module using a discrete event-based simulator to assess the extent of queuing characteristics present in the EV charging infrastructure configuration and if needed adjust the recommendation from the optimal planning module to minimize issues determined from the simulator; and
  generating one or more charging schedules via a controlling module for custom EV charging based on one or more input parameters;
  wherein said method is performed by a processor executing instructions stored on a non-transitory medium,
  and wherein said charging schedules are generated from the controlling module based on short term forecasting, rolling unit commitment, optimal dispatch and error correction for generating a custom EV charging profile; and
  wherein the custom EV charging profile is generated based on one or more input parameters are selected from the group comprising: weather conditions, EV charging needs, EV queue management strategy, cost of energy, pricing strategy, and behavior of EV end users to minimizing operating cost of the EV charging infrastructure.

17. The method of claim 16, wherein the queuing characteristics are selected from the group comprising: waiting time, queue length, impact of interchange or transition times, and instances of impatience.

18. The method of claim 16, wherein the one or more input parameters are selected from the group comprising: EV facility infrastructure, EV facility preferences, EV mobility behavior and preferences, EV end user preferences, EV data, distributed energy resource (DER) specifications, utility and market data, weather data, master data, financial data, business model data.

19. The method of claim 16, wherein generating the recommendation comprises generating solutions in response to mathematical models, machine learning, and convex optimization to determine optimal component sizes and control set-points within the EV charging infrastructure.

20. The method of claim 16, wherein generating the recommendation comprises generating the recommendation by utilizing objective functions to support a selected objective optimization goal with respect to the EV charging infrastructure.

21. The method of claim 20, wherein said objective function comprises a deterministic algorithm in which uncertainty in any input parameters is not considered when modeling the system.

22. The method of claim 20, wherein said objective function comprises a stochastic algorithm that accounts for uncertainty in at least a portion of the input parameters.

23. The method of claim 16, wherein generating the recommendation comprises generating outputs selected from the group of outputs comprising: financial data output, technical operations data output, and business model data output.

24. The method of claim 23, wherein said financial output is selected from the group of financial data outputs comprising: investment decisions, type, number and size of EV chargers in the EV charging infrastructure, investment for EV charging infrastructure upgrades, annualized investment cost of the EV charging infrastructure, and operating costs of the EV charging infrastructure.

25. The method of claim 23, wherein said technical operations data output is selected from the group of technical operations data outputs comprising: per unit time load profile for EV facility load with contribution from residential load and each EV charger load, charger utilization, queue length, queue waiting time and space usage statistics as a function of unit time for an individual EV being charged, and fulfilled and unfulfilled charging requirements.

26. The method of claim 23, wherein said business model data output is selected from the group of business model data outputs comprising: suggested pricing schemes, financial analysis of the EV charging infrastructure, cash flow with respect to the EV charging infrastructure, and net present value of the EV charging infrastructure.

27. The method of claim 16, wherein the one or more input parameters are selected from the group comprising: battery capacity, state of charge upon arrival or departure, facility operating hours, queue management strategy, queue length, waiting time, and transition time.

28. The method of claim 16, wherein the optimal planning module comprises a pre-processing module that processes the one or more input parameters and outputs an aggregated or individual EV charging demand profile for input by an optimization module.

29. The method of claim 28, the EV charging demand profile is adjusted for statistical variance.

30. The method of claim 28, wherein the pre-processing module further generates one or more facility profiles.

* * * * *